(12) United States Patent
Yang et al.

(10) Patent No.: US 12,053,962 B2
(45) Date of Patent: Aug. 6, 2024

(54) RADIATIVE COOLING FABRICS AND PRODUCTS

(71) Applicants: NINGBO RADI-COOL ADVANCED ENERGY TECHNOLOGIES CO., LTD., Ningbo (CN); NINGBO RUILING ADVANCED ENERGY MATERIALS INSTITUTE CO., LTD., Ningbo (CN)

(72) Inventors: Ronggui Yang, Ningbo (CN); Jian Yang, Ningbo (CN); Minghui Wang, Ningbo (CN); Jingtao Xu, Ningbo (CN); Yuanyuan Zhang, Ningbo (CN)

(73) Assignees: NINGBO RADI-COOL ADVANCED ENERGY TECHNOLOGIES CO., LTD., Ningbo (CN); NINGBO RUILING ADVANCED ENERGY MATERIALS INSTITUTE CO., LTD., Ningbo (CN)

( * ) Notice: Subject to any disclaimer, the term of this patent is extended or adjusted under 35 U.S.C. 154(b) by 1033 days.

(21) Appl. No.: 16/968,600

(22) PCT Filed: Jul. 10, 2020

(86) PCT No.: PCT/CN2020/101230
§ 371 (c)(1),
(2) Date: Aug. 9, 2020

(87) PCT Pub. No.: WO2021/088398
PCT Pub. Date: May 14, 2021

(65) Prior Publication Data
US 2023/0158786 A1    May 25, 2023

(30) Foreign Application Priority Data

Nov. 6, 2019 (CN) .......................... 201911075603.7
Nov. 8, 2019 (CN) .......................... 201911086548.1

(51) Int. Cl.
  *B32B 5/02* (2006.01)
  *A45B 25/18* (2006.01)
  (Continued)

(52) U.S. Cl.
  CPC ................. *B32B 27/12* (2013.01); *B32B 5/02* (2013.01); *B32B 7/02* (2013.01); *B32B 25/08* (2013.01);
  (Continued)

(58) Field of Classification Search
  CPC ........... A45B 25/18; B32B 5/02; B32B 33/00; B32B 2311/00; B32B 2571/00;
  (Continued)

(56) References Cited

U.S. PATENT DOCUMENTS 5,134,025 A     7/1992   Zenda et al.
2021/0002491 A1  1/2021  Xu et al.

FOREIGN PATENT DOCUMENTS

CN   1968808 A    5/2007
CN   207088643 U  3/2018
(Continued)

OTHER PUBLICATIONS

Office action of CN2019110756037.
(Continued)

*Primary Examiner* — Camie S Thompson

(57) ABSTRACT

A radiative cooling fabric comprises a flexible substrate layer and a functional layer stacked in order. The first functional layer comprises a first functional resin and a first functional filler dispersed in the first functional resin. A mass fraction of the first functional filler in the first functional layer is in a range of 1% to 20%. An emissivity of the radiative cooling fabrics in the wavelength of 7 μm to 14 μm is not less than 80%. A reflectivity of the radiative cooling fabrics in the wavelength of 300 nm to 2500 nm is not less
(Continued)

than 80%. An average value of warp recovery angles of the radiative cooling fabrics is greater than or equal to 95°, and an average value of the weft recovery angles of the radiative cooling fabrics is greater than or equal to 91°.

19 Claims, 8 Drawing Sheets

(51) Int. Cl.
| | |
|---|---|
| A47H 23/08 | (2006.01) |
| B32B 7/02 | (2019.01) |
| B32B 25/08 | (2006.01) |
| B32B 25/20 | (2006.01) |
| B32B 27/08 | (2006.01) |
| B32B 27/12 | (2006.01) |
| B32B 27/30 | (2006.01) |
| B32B 27/38 | (2006.01) |
| B32B 27/40 | (2006.01) |
| B60J 11/04 | (2006.01) |
| D06N 3/00 | (2006.01) |
| E04H 15/54 | (2006.01) |

(52) U.S. Cl.
CPC .............. *B32B 25/20* (2013.01); *B32B 27/08* (2013.01); *B32B 27/308* (2013.01); *B32B 27/38* (2013.01); *B32B 27/40* (2013.01); *D06N 3/00* (2013.01); *D06N 3/0063* (2013.01); *A45B 25/18* (2013.01); *A47H 23/08* (2013.01); *B32B 2255/10* (2013.01); *B32B 2255/26* (2013.01); *B32B 2255/28* (2013.01); *B32B 2262/0276* (2013.01); *B32B 2264/1021* (2020.08); *B32B 2307/302* (2013.01); *B32B 2307/712* (2013.01); *B32B 2307/7265* (2013.01); *B32B 2307/732* (2013.01); *B32B 2437/00* (2013.01); *B32B 2437/04* (2013.01); *B60J 11/04* (2013.01); *D06N 2209/0876* (2013.01); *E04H 15/54* (2013.01)

(58) Field of Classification Search
CPC ............ B32B 2437/00; B32B 2437/04; B32B 2255/00; B32B 2255/02; B32B 2255/10; B32B 2255/26; B32B 2255/28; B32B 2262/0246; B32B 2262/0261; B32B 2262/0276; B32B 2262/062; B32B 2262/08; B32B 25/08; B32B 25/20; B32B 7/00; B32B 7/02; B32B 27/12; B32B 27/00; B32B 27/06; B32B 27/08; B32B 27/18; B32B 27/20; B32B 27/281; B32B 27/283; B32B 27/308; B32B 27/325; B32B 27/36; B32B 27/38; B32B 27/40; B32B 2307/7376; B32B 2307/30; B32B 2307/302; B32B 2307/412; B32B 2307/416; B32B 2307/7265; B32B 2307/73; B32B 2307/265; B32B 2307/732; B32B 2264/1023; B32B 2264/303; B32B 2264/1021; B32B 2264/1025; B32B 2264/101; B32B 2264/102; B32B 2264/104; B32B 2264/105; B32B 2264/107; E04F 10/02; B01J 11/04; D06N 3/00; D06N 3/04; D06N 3/0063; D06N 3/06; D06N 3/12; D06N 3/14; D06N 2209/0876; E04H 15/54; A47H 23/08

See application file for complete search history.

(56) References Cited

FOREIGN PATENT DOCUMENTS

| | | | |
|---|---|---|---|
| CN | 108329726 | A | 7/2018 |
| CN | 108891115 | A | 11/2018 |
| CN | 109572114 | A | 4/2019 |
| CN | 109622343 | A | 4/2019 |
| CN | 109651973 | A | 4/2019 |
| CN | 109906840 | A | 6/2019 |
| CN | 110103559 | * | 8/2019 |
| CN | 110103559 | A | 8/2019 |
| CN | 110128688 | A | 8/2019 |
| CN | 110216924 | A | 9/2019 |
| CN | 110256912 | A | 9/2019 |
| CN | 110317521 | A | 10/2019 |
| CN | 110387751 | A | 10/2019 |
| CN | 110777543 | A | 2/2020 |
| CN | 110815985 | A | 2/2020 |
| CN | 110896639 | A | 3/2020 |
| EP | 3744517 | A1 | 12/2020 |
| EP | 3760678 | A1 | 1/2021 |
| IN | 109849466 | A | 6/2019 |
| JP | UP2011163715 | A | 8/2011 |
| JP | 2015101930 | A | 6/2015 |
| WO | WO2014082011 | A1 | 5/2014 |

OTHER PUBLICATIONS

Office action of CN2019110865481.
Search Report of EP20020365.1.
ISR of PCT/CN2020/101230.
Office action of TW109126376.
Search report of 11202007745W.
Examination report of AU2020217350.
India Examination Report of 202027034841.

* cited by examiner

RADIATIVE COOLING FABRICS AND PRODUCTS

CROSS-REFERENCE TO RELATED APPLICATIONS

This application is a 371 of international PCT patent application PCT/CN2020/101230 filed on Jul. 10, 2020, which claims all benefits accruing under 35 U.S.C. § 119 from China Patent Application Nos. 201911086548.1, filed on Nov. 8, 2019, with title of "RADIATIVE COOLING FABRICS AND APPLICATION THEREOF", and 201911075603.7, filed on Nov. 6, 2019, with title of "RADIATIVE COOLING FUNCTIONAL LAYER, RADIATIVE COOLING FABRICS AND PREPARATION METHOD THEREOF", in the China National Intellectual Property Administration, the content of which is hereby incorporated by reference.

TECHNICAL FIELD

The present disclosure relates to the technical field of radiative cooling, and in particular, to radiative cooling fabrics and products using the same.

BACKGROUND

There are various sunshade products on the market presently, such as sun visors, outdoor blinds, outdoor hard roller blinds, outdoor soft roller blinds, ceiling curtains, canopy curtains, awnings, car covers, umbrellas, etc. However, the conventional sunshade products usually only have the function of shading and have no cooling effect. With the development of radiative cooling technology, researchers began to study the application of radiative cooling technology in sunshade products in order to introduce an automatic cooling function into the sunshade products. However, there are many practical problems needed to be solved in the combination of fabric and functional layer.

SUMMARY

Based on this, it is necessary to provide a radiative cooling fabric having shading and automatic cooling functions, which further has a great temperature-lowering effect and has a good wrinkle resistance performance.

The present disclosure provides a radiative cooling fabric, comprising a flexible substrate layer and a functional layer stacked in order; the functional layer comprises a first functional layer with a thickness of 10 μm to 200 μm, and the first functional layer comprises a first functional resin and a first functional filler dispersed in the first functional resin; a mass fraction of the first functional filler in the first functional layer is in a range of 1% to 20%, an emissivity of the radiative cooling fabric in a wavelength of 7 μm to 14 μm is not less than 80%, a reflectivity of the radiative cooling fabric in a wavelength of 300 nm to 2500 nm is not less than 80%. An average value of warp recovery angles of the radiative cooling fabric is greater than or equal to 95°, and an average value of the weft recovery angles of the radiative cooling fabric is greater than or equal to 91°.

In one embodiment, the first functional filler further comprises a first filler and a second filler, a particle size of the first filler is greater than or equal to 0.01 μm and less than 5 μm, a particle size of the second filler is greater than or equal to 5 μm and less than or equal to 15 μm, a ratio of a mass of the first filler to a mass of the second filler is in a range of 1:4 to 4:1; or the first filler and the second filler are independently selected from cesium-tungsten-bronze alloy ($Cs_xWO_3$), tin antimony oxide, indium tin oxide, zinc aluminum oxide, silicon dioxide, silicon carbide, titanium dioxide, calcium carbonate, barium sulfate, silicon nitride, or a combination thereof.

In one embodiment, the functional layer further comprises a second functional layer, the first functional layer is located on the flexible substrate layer, and the second functional layer is located on a surface of the first functional layer away from the flexible substrate layer; the second functional layer is formed by disposing a second functional filler on the surface of the first functional layer; a thickness of the first functional layer is in a range of 10 μm to 30 μm, and a particle size of the second functional filler is in a range of 1 μm to 40 μm.

In one embodiment, a particle size of the second functional filler is 0.5 times to 1.5 times of the thickness of the first functional layer; or an amount of the second functional filler is in a range of 10 g/m² to 200 g/m², with respect to an area of a surface of the radiative cooling fabric; or the second functional filler is ceramic powder, titanium white powder, glass microbeads, silicon dioxide, calcium carbonate powder, barium sulfate, talcum powder, zinc sulfate, aluminum silicate, calcium carbonate powder, pearl powder, alumina, zinc oxide, zirconia, cerium oxide, lanthanum oxide, rhodium oxide, magnesium oxide, or a combination thereof.

In one embodiment, the functional layer further comprises a third functional layer located on a surface of the second functional layer away from the first functional layer, and the third functional layer comprises a second functional resin, and a thickness of the third functional layer is in a range of 10 μm to 30 μm.

In one embodiment, the third functional layer further comprises a third functional filler, the third functional filler is ceramic powder, titanium white powder, glass microbeads, silicon dioxide, calcium carbonate powder, barium sulfate, talcum powder, zinc sulfate, aluminum silicate, calcium carbonate powder, pearl powder, alumina, zinc oxide, zirconia, cerium oxide, lanthanum oxide, rhodium oxide, magnesium oxide, or a combination thereof; and a particle size of the third functional filler is in a range of 4 μm to 20 μm.

In one embodiment, the first functional resin and the second functional resin are independently selected from polyimide, cycloolefin polymer, epoxy resin, polyester resin, polyurethane resin, acrylic resin, silicone resin, fluorine resin, or a combination thereof.

In one embodiment, a thickness of the flexible substrate layer is in a range of 300 μm to 2 mm; and the flexible substrate layer comprises a fabric layer and a resin coating layer coated on one side or both sides of the fabric layer, a thickness of the resin coating layer is in a range of 1 μm to 20 μm, a material of the fabric layer is polyester, nylon, acrylic, silk, cotton, hemp, or a combination thereof, and a material of the resin coating layer is polyvinyl chloride resin, acrylic resin, epoxy resin, phenol resin, polyurethane resin, or a combination thereof.

In one embodiment, further comprising an interfacial agent layer located between the flexible substrate layer and the functional layer, a thickness of the interfacial agent layer is in a range of 1 μm to 20 μm, and a material of the interfacial agent layer is acrylic resin, polyurethane resin, epoxy resin, or a combination thereof.

In one embodiment, further comprising a waterproof layer located on a side of the flexible substrate layer away from the functional layer, a thickness of the waterproof layer is in a range of 1 μm to 20 μm, a material of the waterproof layer is acrylic resin, polyurethane resin, epoxy resin, or a combination thereof, and a transmittance of the waterproof layer is greater than or equal to 80% in a wavelength of 400 nm to 700 nm.

In one embodiment, further comprising a hydrophobic layer located on a side of the functional layer away from the flexible substrate layer, a thickness of the hydrophobic layer is a range of 1 μm to 20 μm, a material of the hydrophobic layer is fluorine resin, silicone resin, or a combination thereof, nano-scaled silicon dioxide particles are dispersed in the hydrophobic layer, a mass fraction of the silicon dioxide particles in the hydrophobic layer is in a range of 0.5% to 5%, and a transmittance of the hydrophobic layer is greater than or equal to 80% in a wavelength of 7 μm to 14 μm.

In one embodiment, further comprising a weather resistant layer located on a side of the functional layer away from the flexible substrate layer, a material of the weather resistant layer is fluorine resin, epoxy resin, polyester resin, polyurethane resin, acrylic resin, silicone resin, or a combination thereof, and a thickness of the weather resistant layer is in a range of 10 μm to 50 μm.

The present disclosure provides a product including a part which is made of the radiative cooling fabric.

In one embodiment, the product is an umbrella comprising a rod, an umbrella rib and an umbrella cloth which is the part made of the radiative cooling fabric, the umbrella rib is connected to the rod, and the umbrella cloth is supported by the umbrella rib.

In one embodiment, the product is a car cover comprising a fixing member and a cover body which is the part made of the radiative cooling fabric, the fixing member is located on the cover body, and the fixing member is configured for fixing the cover body on a car.

In one embodiment, the product is a tent comprising a tent frame and a flysheet made of the radiative cooling fabric, and the tent frame is covered by the flysheet.

In one embodiment, the product is a hat comprising a hat body made of the radiative cooling fabric, the hat body has a cavity configured for accommodating the head.

In one embodiment, the product is a curtain comprising a curtain body made of the radiative cooling fabric, the curtain body is a part of the curtain.

In one embodiment, the product is an awning comprising an awning frame and an awning cloth made of the radiative cooling fabric, the awning frame is covered by the awning cloth.

In one embodiment, the product is clothing comprising cloth made of the radiative cooling fabric.

The radiative cooling fabric provided by this disclosure has excellent shading and radiative cooling effect, and the radiative cooling fabric also has a good wrinkle resistance performance, even if folded repeatedly, the surface of the radiative cooling fabric is not easy to wrinkle. The radiative cooling fabric can be used to make curtains, car covers, tents, awnings, umbrellas, clothing, hats, or other products, so that these products not only have shading functions, but also have good automatic cooling functions.

Figure 1:
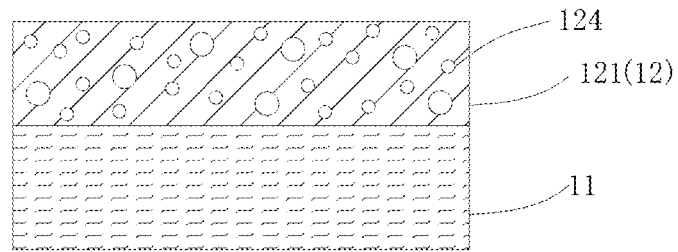
FIG. 1 is a schematic diagram of a radiative cooling fabric in one embodiment of the present disclosure.

In the drawings, 11 represents a flexible substrate layer; 12 represents a functional layer; 13 represents an interfacial agent layer; 14 represents a waterproof layer; 15 represents a hydrophobic layer; 16 represents a weather resistant layer; 121 represents a first functional layer; 122 represents a second functional layer; 123 represents a third functional layer; 124 represents a first functional filler; 125 represents a second functional filler; 126 represents a third functional filler; 20 represents an umbrella; 21 represents an umbrella cloth; 22 represents an umbrella rib; 23 represents a rod; 30 represents a car cover; 31 represents a cover body; 32 represents a fixing member; 321 represents a magnetic attraction layer; 322 represents a magnetic body; 40 represents a tent; 41 represents a flysheet; 42 represents a tent frame; 43 represents an inner tent; 44 represents a detachable part; 45 represents a power supply; 46 represents a sensor; 47 represents an alarm; 48 represents a controller; 49 represents a door body; 50 represents a hat; 51 represents a hat body; 511 represents a vent; 52 represents a curtain; 521 represents a mounting plate; 5211 represents a mounting hole; 522 represents a curtain body; 53 represents a storage bag; 54 represents a cooling bag; 60 represents a curtain; 70 represents an awning; 71 represents an awning frame; 72 represents an awning cloth; 80 represents a clothing; 81 represents cloth.

DETAILED DESCRIPTION

The technical proposals of the embodiments of the present disclosure will be clearly and completely described below by combining with drawings. It is obvious that the described embodiments are only a part and not all of the embodiments of the present disclosure. All other embodiments obtained by one skilled in the art based on the embodiments of the present disclosure without any creative efforts are within the scope of the present disclosure.

The present disclosure provides a radiative cooling fabric. The radiative cooling fabric can include a flexible substrate layer 11 and a functional layer 12 stacked on top of one another. The functional layer 12 can be configured for reflecting sunlight and reducing the temperature automatically.

As shown in FIG. 1, an embodiment of the present disclosure provides a radiative cooling fabric. A functional layer 12 can include a first functional layer 121. The first functional layer 121 can include a first functional resin and a first functional filler 124, and the first functional filler 124 can be dispersed in the first functional resin.

The reflection performance and the automatic cooling performance of the functional layer 12 can be affected by both the first functional resin and the first functional filler 124 of the first functional layer 121. The thicker the first functional layer 121 is, the better the reflection performance and the automatic cooling performance are. The more the content of the first functional filler 124 is, the better the reflection performance and the automatic cooling performance are. However, it was found that if the thickness of the first functional layer 121 is too thick or the content of the first functional filler 124 is too much, the wrinkle resistance of the radiative cooling fabric will get worse. Especially after many times of folding, the surface of the radiative cooling fabric will have many wrinkles, which will affect the appearance and the performance of the radiative cooling fabric. However, if the thickness of the first functional layer 121 is too thin or the content of the first functional filler 124 is insufficient, the reflection performance and the automatic cooling performance of the radiative cooling fabric will get worse.

To balance these two properties of the radiative cooling fabric, it was found that when a thickness of the first function layer 121 is in a range of 10 μm to 200 μm, and a mass fraction of the first functional filler 124 in the first functional layer 121 is in a range of 1% to 20%, the emissivity of the first functional layer 121 in the wavelength of 7 μm to 14 μm can be not less than 80%, and the reflectivity of the first functional layer 121 in the wavelength of 300 nm to 2500 nm can be not less than 80%. Additionally, the radiative cooling fabric can also have good wrinkle resistance.

Specifically, the wrinkle resistance of the radiative cooling fabric can be characterized by a fold recovery angle, an average value of a warp recovery angle can be greater than or equal to 95°, and an average value of a weft recovery angle can be greater than or equal to 91°.

In one or more embodiment(s), when a thickness of the flexible substrate layer 11 is in a range of 300 μm to 2 mm, and a mass fraction of the first functional filler 124 of the first functional layer 121 is in a range of 8% to 20%, the average value of the warp recovery angle can be greater than or equal to 98°, and the average value of the weft recovery angle can be greater than or equal to 93°.

The first functional filler 124 can include a first filler and a second filler. A particle size of the first filler can be greater than or equal to 0.01 μm and less than 5 μm. A particle size of the second filler can be greater than or equal to 5 μm and less than or equal to 15 μm. A ratio of a mass of the first filler to a mass of the second filler can be in a range of 1:4 to 4:1.

Both the first filler and the second filler can emit infrared rays in the wavelength of the atmospheric window (in a range of 7 μm to 14 μm), thereby achieving effectively radiative cooling. Additionally, the first filler with small particle size can reflect sunlight better (in a range of 300 nm to 2500 nm), and the second filler with large particle size can further increase the reflectivity of sunlight in the first functional layer 121. So, the first functional filler 124 with a combination of different particle sizes can reflect sunlight better, thereby improving the reflection and heat insulation effect of the radiative cooling fabric.

In one or more embodiment, the first filler and the second filler can be independently selected from $Cs_xWO_3$, tin antimony oxide, indium tin oxide, zinc aluminum oxide, silicon dioxide, silicon carbide, titanium dioxide, calcium carbonate, barium sulfate, silicon nitride, or a combination thereof.

In one or more embodiment, the first functional layer 121 can also include an additive dispersed in the resin substrate layer. The additive can be but not limited to dispersants, defoamer, wetting agent, preservative, film-forming additive, thickener, or a combination thereof.

It should be noted that a number of the first functional layer 121 is not limited and can be one layer or multiple layers.

Figure 2:
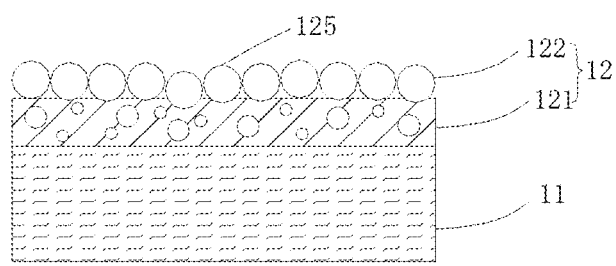
FIG. 2 is a schematic diagram of a radiative cooling fabric in another embodiment of the present disclosure.

As shown in FIG. 2, another embodiment of the present disclosure provides a radiative cooling fabric. The functional layer 12 in this embodiment can further include a second functional layer 122. The first functional layer 121 can be located on the flexible substrate layer 11, and the second functional layer 122 can be located on a surface of the first functional layer 121 away from the flexible substrate layer 11. The second functional layer 122 can be formed by disposing a second functional filler 125 on the surface of the first functional layer 121. The second functional filler 125 can be bonded to the first functional layer 121. A thickness of the first functional layer 121 can be in a range of 10 μm to 30 μm. A particle size of the second functional filler 125 can be in a range of 1 μm to 40 μm.

In one or more embodiment, a particle size of the second functional filler 125 can be 0.5 times to 1.5 times of a thickness of the first functional layer 121. An amount of the second functional filler 125 can be in a range of 10 g/m² to 200 g/m², with respect to an area of a surface of the radiative cooling fabric.

The second functional filler 125 can be configured for increasing the reflectivity of the functional layer 12 in the wavelength of 300 nm to 2500 nm. The second functional filler 125 can be ceramic powder, titanium white powder, glass microbeads, silicon dioxide, calcium carbonate powder, barium sulfate, talcum powder, zinc sulfate, aluminum silicate, calcium carbonate powder, pearl powder, alumina, zinc oxide, zirconia, cerium oxide, lanthanum oxide, rhodium oxide, magnesium oxide, or a combination thereof. The second functional filler 125 can preferably have a shape of spherical or ellipsoidal.

Coating the second functional filler 125 on the first functional layer 121 can greatly increase the reflectivity of the functional layer 12, thereby improving the radiative cooling efficiency of the functional layer 12 during daytime, and then a thickness of the functional layer 12 can be further reduced. The functional layer 12 can have a reflectivity greater than 88% in the wavelength of 300 nm to 2500 nm and an emissivity greater than 90% in the wavelength of 7 μm to 14 μm with a thickness no more than 50 μm. Disposing the second functional filler 125 on the first functional layer 121 is beneficial to obtain a radiative cooling fabric with better flexibility and higher radiative cooling effect.

It should be noted that the second functional filler 125 is disposed on the surface of the first functional layer 121 in a single layer to form the second functional layer 122. That is, all the second functional filler 125 can be bonded to the first functional layer 121, the second functional filler 125 does not stack with each other. So, the thickness of the second functional layer 122 can be less than or equal to the particle size of the second functional filler 125.

Specifically, the present disclosure further provides a preparation method of the functional layer 12, which includes the following steps.

S1, forming a first functional layer 121 on a flexible substrate layer 11, and spraying a second functional filler 125 evenly onto a surface of the first functional layer 121 before the first functional layer 121 is dried or cured; and S2, drying or curing the first functional layer 121, so that the second functional filler 125 is bonded to the first functional layer 121 to form a second functional layer 122.

It should be noted that the term "curing" in the specification and claims of the present disclosure can be but not limited to heat curing, light curing, natural drying, etc., the first functional layer 121 can be prepared by scraping, rolling, spraying, brushing, and the like, and the second functional filler 125 can be atomized by a pneumatic spray device and then sprayed evenly onto the surface of the first functional layer 121.

Figure 3:
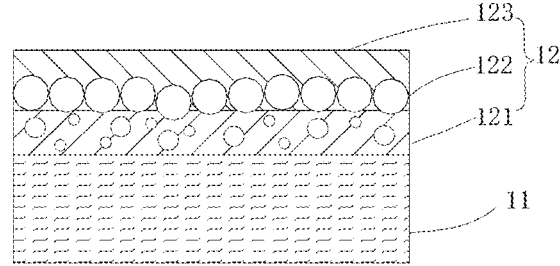
FIG. 3 is a schematic diagram of a radiative cooling fabric in another embodiment of the present disclosure.

As shown in FIG. 3, another embodiment of the present disclosure provides a radiative cooling fabric. On the basis of the embodiment of FIG. 2, the functional layer 12 in this embodiment can further include a third functional layer 123. The third functional layer 123 can be located on a surface of the second functional layer 122 away from the first functional layer 121. The third functional layer 123 can include a second functional resin. A thickness of the third functional layer 123 can be in a range of 10 μm to 30 μm.

It should be noted that since the second functional layer 122 is formed by disposing the second functional filler 125, there can be a gap between the two adjacent second functional filler 125. The third functional resin of the third functional layer 123 can fill the gap and be bonded to the first functional layer 121.

A thickness of the third functional layer 123 can be greater than or equal to the particle size of the second functional filler 125, so that the third functional layer 123 can fully cover the second functional filler 125 and bond to the second functional filler 125.

Specifically, the preparation method of the functional layer 12 can further include forming and curing a third functional layer 123 on a surface of the second functional layer 122.

Figure 4:
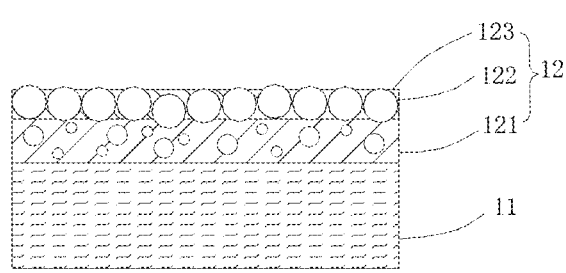
FIG. 4 is a schematic diagram of a radiative cooling fabric in another embodiment of the present disclosure.

As shown in FIG. 4, another embodiment of the present disclosure provides a radiative cooling fabric. Different from the structure shown in FIG. 3, a thickness of the third functional layer 123 in this embodiment can be less than the particle size of the second functional filler 125, therefore, part of the second functional filler 125 can protrude from a surface of the third functional layer 123.

Figure 5:
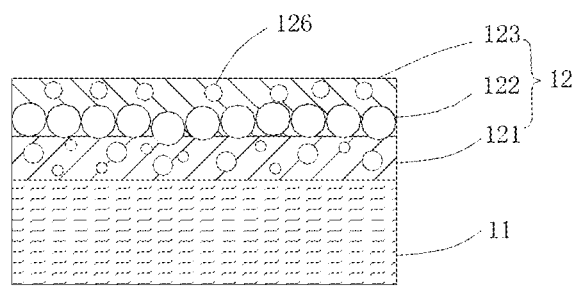
FIG. 5 a schematic diagram of a radiative cooling fabric in another embodiment of the present disclosure.

As shown in FIG. 5, another embodiment of the present disclosure provides a radiative cooling fabric. On the basis of the embodiments of FIG. 3 and FIG. 4, the third functional layer 123 in this embodiment can further include a third functional filler 126 dispersed in the second functional resin. The third functional filler 126 can be a filler with a high emissivity in the wavelength of 7 μm to 14 μm and a high reflectivity in the wavelength of 300 nm to 2500 nm to further improve the radiative cooling effect of the functional layer 12.

In one or more embodiment, the third functional filler 126 can be ceramic powder, titanium white powder, glass microbeads, silicon dioxide, calcium carbonate powder, barium sulfate, talcum powder, zinc sulfate, aluminum silicate, calcium carbonate powder, pearl powder, alumina, zinc oxide, zirconia, cerium oxide, lanthanum oxide, rhodium oxide, magnesium oxide, or a combination thereof. A particle size of the third functional filler 126 can be in a range of 4 μm to 20 μm.

Due to the arrangement of the second functional layer 122 and the third functional layer 123, the radiative cooling effect of the functional layer 12 can be improved, and the thickness of the functional layer 12 can be further reduced (basically no more than 100 μm), so that the radiative cooling fabric can have better radiative cooling effect and wrinkle resistance, meanwhile, the cost can be reduced.

The radiative cooling function of the resin should be considered, so that the functional layer 12 can achieve the radiative cooling effect due to the resin and the functional filler together. In the embodiments of FIG. 1 to FIG. 5, the first functional resin and the second functional resin can be independently selected from polyimide, cycloolefin polymer, epoxy resin, polyester resin, polyurethane resin, acrylic resin, silicone resin, fluorine resin, or a combination thereof.

In one or more embodiment, the flexible substrate layer 11 can include a fabric layer and a resin coating layer coated on one side or both sides of the fabric layer. A thickness of the resin coating layer can be in a range of 1 μm to 20 μm. A material of the fabric layer can include polyester, nylon, acrylic, silk, cotton, hemp, or a combination thereof. A material of the resin coating layer can include polyvinyl chloride resin, acrylic resin, epoxy resin, phenol resin, polyurethane resin, or a combination thereof.

Figure 6:
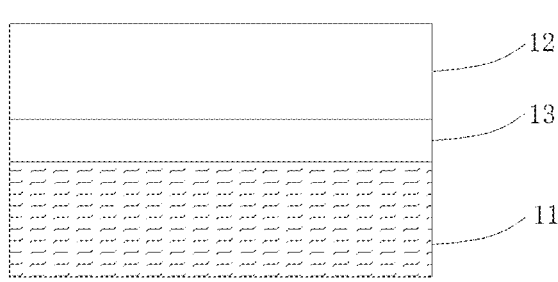
FIG. 6 is a schematic diagram of a radiative cooling fabric in another embodiment of the present disclosure.

As shown in FIG. 6, another embodiment of the present disclosure provides a radiative cooling fabric. On the basis of the embodiments of FIG. 1 to FIG. 5, an interfacial agent layer 13 can be located between the flexible substrate layer 11 and the functional layer 12. A thickness of the interfacial agent layer 13 can be in a range of 1 μm to 20 μm, and a material of the interfacial agent layer 13 can include acrylic resin, polyurethane resin, epoxy resin, or a combination thereof. The interfacial agent layer 13 can be configured for improving the adhesion of the functional layer 12 on the flexible substrate layer 11, and the interfacial agent layer 13 can also be waterproof.

Figure 7:
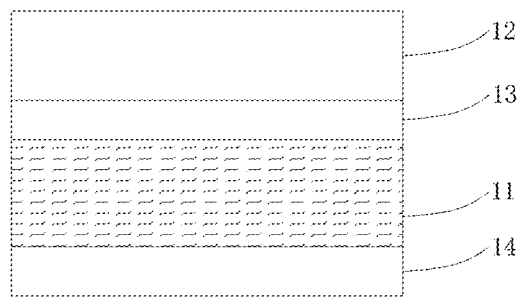
FIG. 7 is a schematic diagram of a radiative cooling fabric in another embodiment of the present disclosure.

As shown in FIG. 7, another embodiment of the present disclosure provides a radiative cooling fabric. On the basis of the embodiments of FIG. 1 to FIG. 6, a waterproof layer 14 can be located on a side of the flexible substrate layer 11 away from the functional layer 12. A thickness of the waterproof layer 14 can be in a range of 1 μm to 20 μm, and a material of the waterproof layer 14 can include acrylic resin, polyurethane resin, epoxy resin, or a combination thereof. The waterproof layer 14 can have a transmittance greater than or equal to 80% in the wavelength of 400 nm to 700 nm. The waterproof layer 14 can have a high light transmittance, and basically cannot block the pattern on the inner surface of the flexible substrate layer 11.

Figure 8:
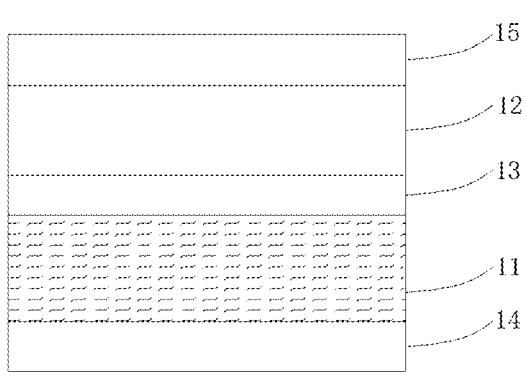
FIG. 8 is a schematic diagram of a radiative cooling fabric in another embodiment of the present disclosure.

As shown in FIG. 8, another embodiment of the present disclosure provides a radiative cooling fabric. On the basis of the embodiments of FIG. 1 to FIG. 7, a hydrophobic layer 15 can be located on a side of the functional layer 12 away from the flexible substrate layer 11. A material of the hydrophobic layer 15 can include fluorine resin, silicone resin, or a combination thereof. Furthermore, nano-scaled silicon dioxide particles can be dispersed in the hydrophobic layer 15. A mass fraction of the silicon dioxide particles in the hydrophobic layer 15 can be in a range of 0.5% to 5%, and a particle size of silicon dioxide particles can be in a range of 0.5 nm to 20 nm. The silicon dioxide particles can further improve a hydrophobic performance of the hydrophobic layer 15, so that a contact angle of the hydrophobic layer 15 can be greater than 110°. A thickness of the hydrophobic layer 15 can be in a range of 1 μm to 20 μm. The hydrophobic layer 15 can have a transmittance greater than or equal to 80% in the infrared wavelength of 7 μm to 14 μm, so that the hydrophobic layer 15 basically cannot affect the radiative cooling effect of the functional layer 12.

Figure 9:
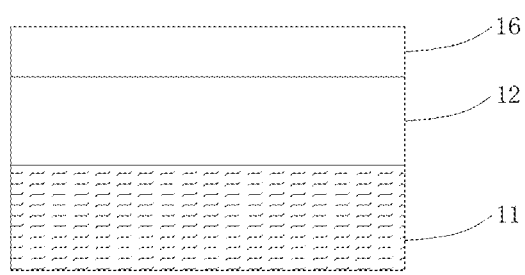
FIG. 9 is a schematic diagram of a radiative cooling fabric in another embodiment of the present disclosure.

As shown in FIG. 9, another embodiment of the present disclosure provides a radiative cooling fabric. On the basis of the embodiments of FIG. 1 to FIG. 7, a weather resistant layer 16 can be located on a side of the functional layer 12 away from the flexible substrate layer 11. A material of the weather resistant layer 16 can include fluorine resin, epoxy resin, polyester resin, polyurethane resin, acrylic resin, silicone resin, or a combination thereof, and a thickness of the weather resistant layer 16 can be in a range of 10 μm to 50 μm.

Therefore, the radiative cooling fabric provided by the present disclosure can have excellent shading and radiative cooling effect and wrinkle resistance performance. Even if folded repeatedly, the surface of the radiative cooling fabric is not easy to wrinkle.

The present disclosure further provides a product using the radiative cooling fabric. The product can include curtains, car covers, tents, awnings, umbrellas, clothing, hats, etc. These products not only have shading function, but also have good automatic cooling effect.

Figure 10:
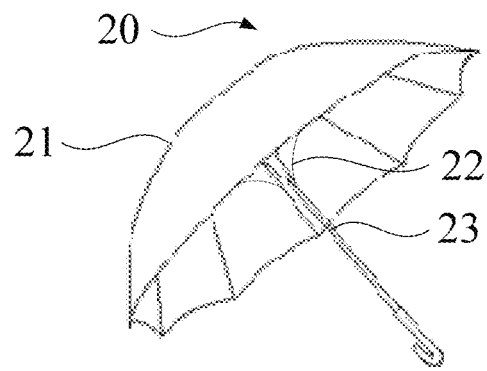
FIG. 10 is a schematic diagram of an embodiment of an umbrella, in which a part made of the radiative cooling fabric of the present disclosure.

As shown in FIG. 10, one embodiment of the present disclosure provides a product made of the radiative cooling fabric of the present disclosure. The product is an umbrella 20 including a rod 23, an umbrella rib 22, and an umbrella cloth 21 made of the radiative cooling fabric. The umbrella rib 22 is connected to the rod 23, and the umbrella cloth 21 is supported by the umbrella rib 22. When sunlight irradiates the umbrella cloth 21, the functional layer 12 of the umbrella cloth 21 can reflect the sunlight to prevent the umbrella cloth 21 from accumulating excessive heat. The umbrella cloth 21 can also emit the heat on the umbrella cloth 21 and in the inner space of the umbrella 20 through an atmospheric window in a form of infrared radiation, so as to achieve cooling without energy consumption and improve user's comfort. Moreover, the umbrella cloth 21 has excellent wrinkle resistance performance; the umbrella cloth 21 is not easy to wrinkle even if folded repeatedly.

It should be noted that the term "inner space of the umbrella 20" in the specification and claims of the present disclosure refers to a space away from the sunlight when the umbrella 20 is in use.

In one or more embodiment(s), the umbrella 20 can further include a solar panel and a fan. The solar panel is electrically connected to the fan. The fan is located on the rod 23 and inside the umbrella cloth 21, and the solar panel is located on the rod 23 and outside the umbrella cloth 21. When sunlight irradiates the solar panels, the solar panels can absorb sunlight and convert the solar energy into electric energy directly or indirectly through photoelectric effect or photochemical effect, so as to provide the electric energy needed for the fans. When the fan is running, it can blow the cold air inside the umbrella cloth 21 to the user, which can increase the air velocity, exchange heat, reduce temperature, and further improve user comfort.

In one or more embodiment, one end of the rod 23 is outside the umbrella cloth 21. A solar panel interface is located on the end. The solar panel interface and the fan are connected through a wire. It should be noted that a fan interface is located on a middle part of the rod 23, the rod 23 has a hollow structure, and the wire passes through the hollowed rod 23. One end of the wire is connected to the solar panel interface, and the other end of the wire is connected to the fan interface. Through the hidden wire accidents caused by broken wires can be avoided, and the umbrella 20 can keep clean and be convenient to use.

It should be noted that the solar panel can be mounted rotationally on the rod 23 and outside the umbrella cloth 21, and the fan can be mounted rotationally on the rod 23 and inside the umbrella cloth 21. This can adjust the direction of the solar panel and the fan according to needs, so that the practicality is increased.

Figure 11:
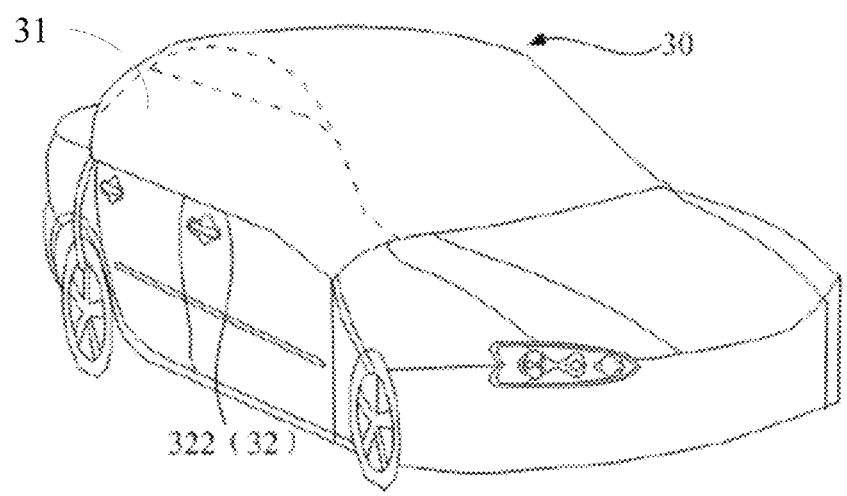
FIG. 11 is a schematic diagram of an embodiment of a car cover, in which a part made of the radiative cooling fabric of the present disclosure.
Figure 12:
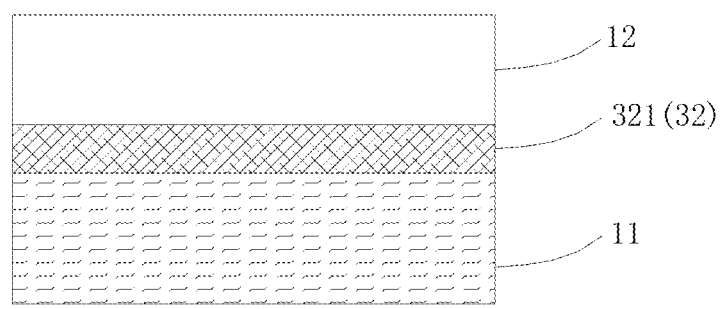
FIG. 12 is a cross-section of the fabric shown in FIG. 11.
Figure 13:
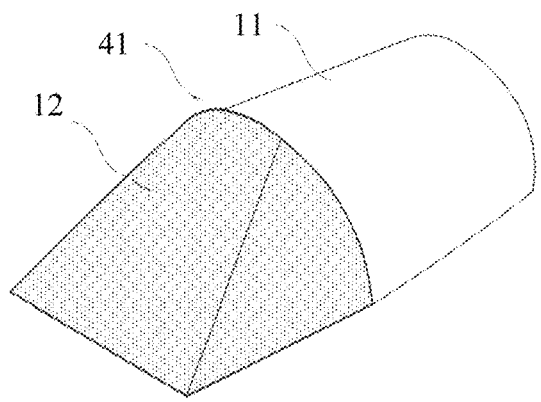
FIG. 13 is a schematic diagram of an embodiment of a flysheet made of the radiative cooling fabric of the present disclosure.
Figure 14:
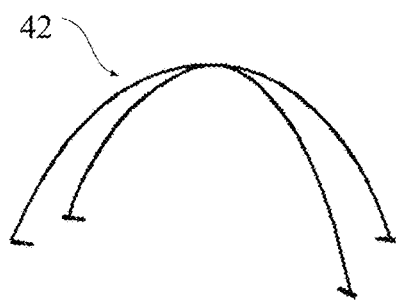
FIG. 14 is a schematic diagram of a tent frame.
Figure 15:
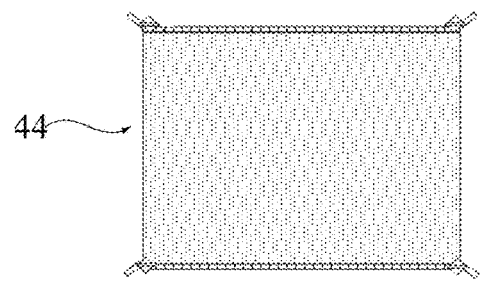
FIG. 15 is a schematic diagram of a detachable part of the flysheet made of the radiative cooling fabric of the present disclosure.
Figure 16:
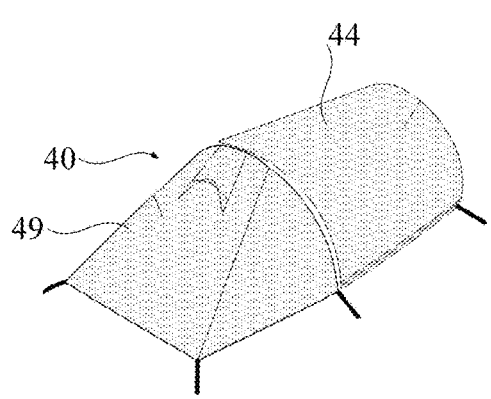
FIG. 16 is a schematic diagram of a detachable part located on a flysheet.
Figure 17:
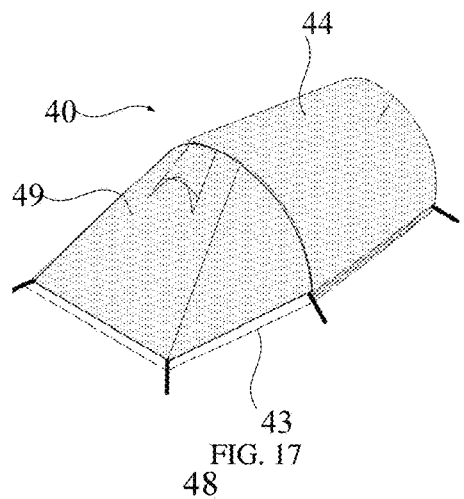
FIG. 17 is a schematic diagram of a detachable part located on an inner tent of a product made of the radiative cooling fabric of the present disclosure.
Figure 18:
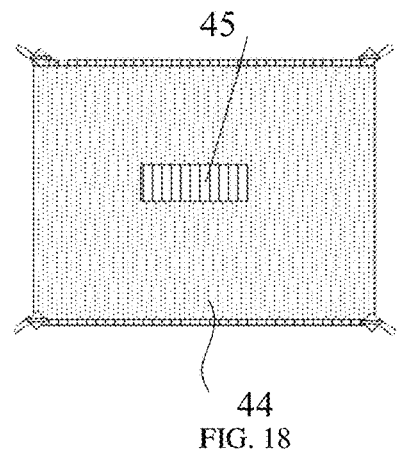
FIG. 18 is a schematic diagram of a power supply located on a detachable part of a product made of the radiative cooling fabric of the present disclosure.
Figure 19:
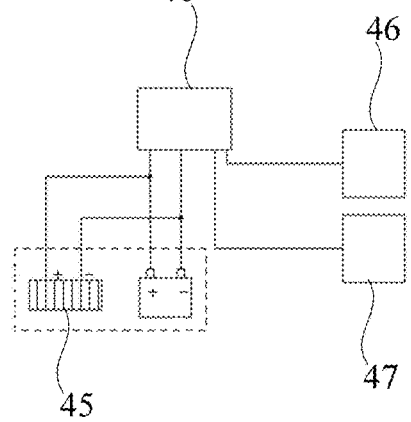
FIG. 19 is a circuit diagram of a power supply, a sensor, an alarm, and a controller of a product made of the radiative cooling fabric of the present disclosure.
Figure 20:
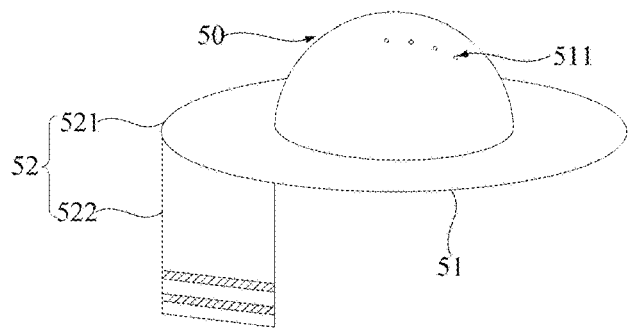
FIG. 20 is a schematic diagram of an embodiment of a hat made of the radiative cooling fabric of the present disclosure.
Figure 21:
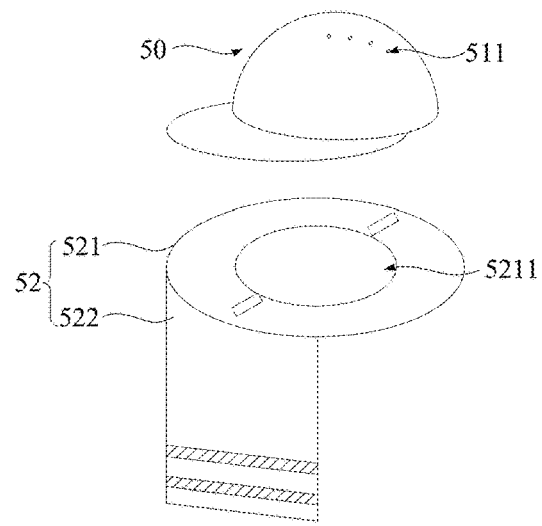
FIG. 21 is an exploded view of the hat shown in FIG. 20.
Figure 22:
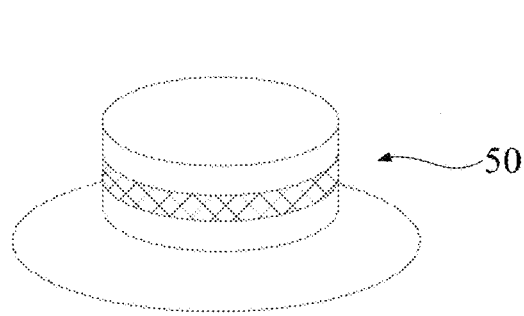
FIG. 22 is a schematic diagram of another embodiment of the hat.
Figure 23:
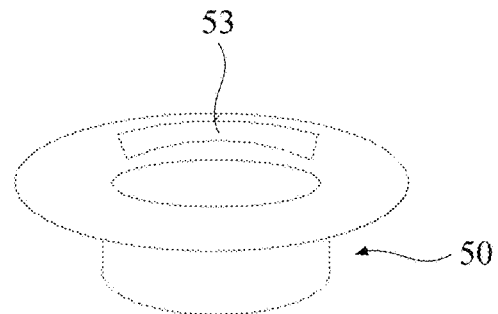
FIG. 23 is a schematic diagram of another embodiment of the hat.
Figure 24:
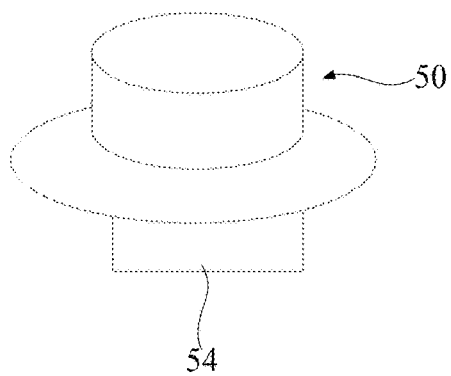
FIG. 24 is a schematic diagram of another embodiment of the hat.

As shown in FIG. 11 and FIG. 12, one embodiment of the present disclosure provides a product made of the radiative cooling fabric of the present disclosure. The product is a car cover 30 including a fixing member 32 and a cover body 31 made of the radiative cooling fabric. The fixing member 32 is provided on the cover body 31. The fixing member 32 is configured for fixing the cover body 31 on a car. Thus, the cover body 31 can be fixed and closely attached to the surface of a car. On one hand, heat outside the car can be effectively prevented from entering the car by convection and heat transfer; on the other hand, when sunlight irradiates the cover body 31, the functional layer 12 of the cover body 31 can reflect the sunlight to prevent the cover body 31 from accumulating excessive heat. The cover body 31 can also emit the heat on the cover body 31 and in the inner space of the car through an atmospheric window in a form of infrared radiation, so as to achieve cooling without energy consumption and improve user comfort. Moreover, the cover body 31 has excellent wrinkle resistance performance. The cover body 31 is not easy to wrinkle even if folded repeatedly.

In one or more embodiment, the fixing member 32 can further include a magnetic attraction layer 321 stacked between the flexible substrate layer 11 and the functional layer 12. With the magnetic attraction layer 321, the cover body 31 can be closely attached to the surface of a car to prevent the cover body 31 from being blown away by strong winds. Moreover, since the cover body 31 is closely attached to the surface of the car, the air between the cover body 31 and the car surface can be reduced, which can avoid damage to the car surface caused by the cover body 31 hitting the car surface under strong winds.

It should be noted that the cover body 31 can also be fixed and closely attached to the surface of a car with an electrostatic attraction layer, an adhesive layer, or a vacuum attraction layer.

In one or more embodiment, a thickness of the magnetic attraction layer 321 can be in a range of 7 μm to 12 μm, so that the car cover 30 can be fixed and closely attached to the surface of a car, and can also be easily removed from the car.

In one or more embodiment, the fixing member 32 can further include a magnetic body 322 located at an edge of the cover body 31. Specifically, the magnetic body 322 can be a magnetic strip arranged at intervals at the edge of the cover body 31; or the magnetic body 322 can be a soft magnetic strip surrounded at the edge of the cover body 31. The cover body 31 can be firmly attracted to the car body with the magnetic body 322.

In one or more embodiment, the fixing member 32 can be a connecting belt and/or a hook. When the fixing member 32 is a connecting belt, one end of the connecting belt is located on the cover body 31, and the other end of the connecting belt is used to detachably connect the wheel. Specifically, a hook is provided at one end of the connecting belt away from the cover body 31, and the connecting belt can be connected to the wheel with the hook. Alternatively, a fastening (such as Velcro) is provided at one end of the connecting belt away from the cover body 31, and the connecting belt can be connected to the wheel with the fastening. It can be understood that the connecting belt can also be fastened to the wheel. The car cover 30 can be firmly fixed on the car with the connecting belt to prevent the car cover 30 from being blown away by strong winds. When the hook is provided at an end of the connecting belt away from the cover body 31, the connecting belt can also be connected to a lower edge of the car or a rearview mirror with the hook. When the fastening is provided on the end of the connecting belt away from the car cover 31, the connecting belt can also be connected to the rearview mirror of the car with the fastening. It can be understood that the connecting belt can also be directly fastened to the rearview mirror. It can be understood that the way in which the end of the connecting belt away from the cover body 31 is connected to the cover body 31 can be selected according to the actual demand.

It should be noted that if the car cover 30 is a half cover, the car cover 30 can be laid on the surface of the cab and trunk during use, and a circle of magnets can be placed at the edge of the car cover 30, so that the car cover 30 can be close to the car surface. And if the car cover 30 is a full cover, the car cover 30 can be laid on the entire surface of the car, and magnets can be placed at a position of the car cover 30 corresponding to the door.

As shown in FIG. 13 to FIG. 19, one embodiment of the present disclosure provides a product made of the radiative cooling fabric of the present disclosure. The product is a tent 40 including a tent frame 42 and a flysheet 41 made of the radiative cooling fabric. An outer side of the tent frame 42 is covered with the flysheet 41. When sunlight irradiates the flysheet 41, the functional layer 12 of the flysheet 41 can reflect the sunlight to prevent the flysheet 41 from accumulating excessive heat. The flysheet 41 can also emit the heat on the cover body 31 and in the inner space of the tent 40 through an atmospheric window in a form of infrared radiation, so as to achieve cooling without energy consumption and improve user comfort. Moreover, the flysheet 41 has excellent wrinkle resistance performance. The flysheet 41 is not easy to wrinkle even if folded repeatedly.

It should be noted that the term "inner space of the tent 40" in the specification and claims of the present disclosure refers to a space away from the outdoors when the tent 40 is in use.

In one or more embodiment, the tent 40 can further include an inner tent 43 and a bottom tent. The inner tent 43 is located on the inner side of the flysheet 41, and the bottom tent is located at the bottom of the inner tent 43, and the inner tent 43 is connected to the tent frame 42. Generally, the inner tent 43 is hoisted to the tent frame 42 by ropes, buckles, etc., and the flysheet 41 is covered on the tent frame 42 so that there is a certain gap between the inner tent 43 and the flysheet 41. A closed space can be formed by providing an inner tent 43 inside the flysheet 41 and a bottom tent at the bottom of the inner tent 43, which can keep heat well and prevent mosquitoes. It can be understood that the inner tent 43 and the flysheet 41 can also be connected by stitching or pasting, and then place the inner tent 43 and the flysheet 41 together on the tent frame 42 to facilitate the folding or opening of the tent 40.

In one or more embodiment, the inner tent 43 can be made of polyester oxford cloth, which makes the tent 40 reliable, windproof, rainproof, and sun proof, so as to meet the requirements of the ordinary outdoor tent 40. It can be understood that the inner tent 43 can also be made of mesh cloth, such as B3 mesh cloth. The mesh cloth has good air permeability and light weight, and is convenient for storage and carrying. Additionally, the mesh cloth can also make the tent 40 have air permeability and anti-mosquito functions.

In one or more embodiment, the tent 40 can further include a detachable part 44. The detachable part 44 can be detachably connected to the flysheet 41 or to a part of the inner tent 43 exposed to the flysheet 41. The detachable part 44 can be located at the position of a dome structure of the tent 40, and a planar shape of the detachable part 44 can be a square.

In one or more embodiment, the detachable part 44 can be made of the radiative cooling fabric. A radiative cooling effect of the tent 40 can be enhanced with the detachable part 44. Additionally, the detachable part 44 is flexible to use and easy to replace.

In one or more embodiment, the detachable part 44 can be detachably connected to the flysheet 41 by zippers, Velcro, buttons, knots, etc., or detachably connected to the part of the inner tent 43 exposed to the flysheet 41.

In one or more embodiment, the tent 40 can further include a door body 49, a side of the flysheet 41 has an opening, and the door body 49 is located at the opening. Specifically, the door body 49 can be shaded in a form of a roller blind or in the form of a flip to facilitate entering and exiting the tent. It can be understood that the door body 49 can also include a window body.

In one or more embodiment, the tent 40 can further include a power supply 45, a sensor 46, an alarm 47, and a controller 48. The sensor 46, the alarm 47, and the controller 48 are respectively electrically connected to the power supply 45. The controller 48 is electrically connected to the sensor 46 and the alarm 47 to meet the multi-functional requirements of the tent 40. In this embodiment, the power supply 45 is a solar flexible battery located on the outer surface of the tent 40.

In one or more embodiment, the sensor 46 can be a temperature sensor 46, a distance sensor 46, a smoke sensor 46, or a combination thereof. The temperature sensor 46 can monitor temperature of the tent 40 to sense the actual temperature inside the tent 40 in real time; the distance sensor 46 can detect whether there is a beast or other objects approaching the tent 40; the smoke sensor 46 can detect whether a fire occurs inside or outside the tent 40. And the alarm 47 can give an alarm in the form of sound and/or light to remind the persons in the tent 40 of a danger or to scare away wild animals.

As shown in FIG. 20 to FIG. 24, one embodiment of the present disclosure provides a product made of the radiative cooling fabric of the present disclosure. The product is a hat 50 including a hat body 51 made of the radiative cooling fabric. The hat body 51 can be a cavity configured for accommodating a head. When sunlight irradiates the hat body 51, the functional layer 12 of the hat body 51 can reflect the sunlight to prevent the hat body 51 from accumulating excessive heat. The functional layer 12 can also emit the heat on the surface of the hat body 51 and in the inner space of the cavity through an atmospheric window in a form of infrared radiation, so as to achieve cooling without energy consumption and improve user comfort. Moreover, the hat body 51 has excellent wrinkle resistance performance. The hat body 51 is not easy to wrinkle even if folded repeatedly.

In one or more embodiment, at least one vent 511 is formed on the hat body 51. The vent 511 can extend from the inner wall of the cavity to the outer wall of the cavity. If there are more than one vents 511, the vents 511 can be arranged oppositely. The heat in the inner space of the cavity can be dissipated to the external environment with the vent 511, so as to realize air circulation in the inner space of the cavity and further reduce the temperature of the inner space of the cavity.

In one or more embodiment, the hat 50 can further include a curtain 52 located at the opening of the cavity. When in use, the curtain 52 hangs on the neck of the user to avoid direct sunlight and sunburn on the neck. The curtain 52 is made of the radiative cooling fabric. When sunlight irradiates the curtain 52, the functional layer 12 of the curtain 52 can reflect the sunlight to prevent the curtain 52 from accumulating excessive heat. The functional layer 12 can also emit the heat on the surface of the curtain 52 through an atmospheric window in a form of infrared radiation, so as to achieve cooling without energy consumption and improve user comfort. Moreover, the curtain 52 has excellent wrinkle resistance performance. The curtain 52 is not easy to wrinkle even if folded repeatedly. The curtain 52 can be folded according to requirements, which is convenient for storage and carrying.

In one or more embodiment(s), the curtain 52 can further include a mounting plate 521 and a curtain body 522 located on an edge of the mounting plate 521. The mounting plate 521 is provided with a mounting hole 5211 adapted to the hat 50. When in use, the mounting plate 521 is clamped on the top of the hat 50 by the mounting hole 5211, which is easy to assemble and disassemble.

In one or more embodiment(s), the hat 50 can further include a storage bag 53 provided in the curtain 52. The storage bag 53 located on a surface of the curtain 52 can store a folded curtain 52, which is convenient for storage and portability In one or more embodiment(s), the hat 50 can further include a cooling bag 54 located on an inner surface of the hat 50 corresponding to a position of the user's back head. Specifically, the cooling bag 54 can be detachably located on the inner surface of the hat 50 with a buckle, a zipper, or the like. Ice cubes, ice packs or other phase change substances can be added into the cooling bag 54 to cool the head. The melting and evaporation of the ice cubes, ice packs or other phase change substances can absorb the heat of the head and cool the head for a long time. It can be understood that even if the ice cubes, ice packs or other phase change materials are not put in, the cooling bag 54 can still reduce the heat generated by solar radiation, because the neck is covered by the cooling bag 54.

In one or more embodiment(s), the hat 50 can further include pigments dispersed in the functional layer 12. Specifically, the pigment can be dispersed in the first functional layer 121, the second functional layer 122, or the third functional layer 123. By adding the pigment in the functional layer 12, it is convenient to classify the hats 50, and it is also convenient for users to identify their own hats 50.

Figure 25:
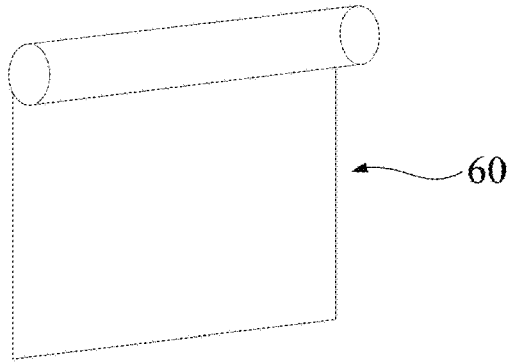
FIG. 25 is a schematic diagram of a curtain made of the radiative cooling fabric of the present disclosure.

As shown in FIG. 25, one embodiment of the present disclosure provides a product made of the radiative cooling fabric of the present disclosure. The product is a curtain 60 including a curtain body made of the radiative cooling fabric. The curtain body forms a part of the curtain 60. When sunlight irradiates the curtain body, the functional layer 12 of the curtain body can reflect the sunlight to prevent the curtain body from accumulating excessive heat. The functional layer 12 can also emit the heat on the surface of the curtain body and in the inner space of a building through an atmospheric window in a form of infrared radiation, so as to achieve cooling without energy consumption and improve user comfort. Moreover, the curtain body has excellent wrinkle resistance performance. The curtain body is not easy to wrinkle even if folded repeatedly. The curtain body can be folded according to requirements, which is convenient for storage and carrying.

Figure 26:
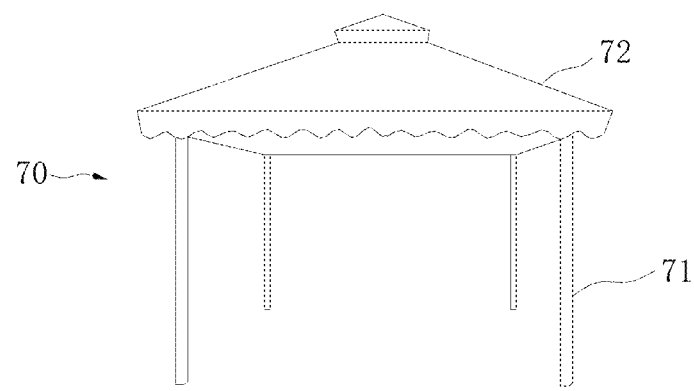
FIG. 26 is a schematic diagram of an awning made of the radiative cooling fabric of the present disclosure.

As shown in FIG. 26, one embodiment of the present disclosure provides a product made of the radiative cooling fabric of the present disclosure. The product is an awning 70 including an awning frame 71 and an awning cloth 72 made of the radiative cooling fabric. The awning frame 71 is covered by the awning cloth 72. When sunlight irradiates the awning cloth 72, the functional layer 12 of the awning cloth 72 can reflect the sunlight to prevent the awning cloth 72 from accumulating excessive heat. The functional layer 12 can also emit the heat on the surface of the awning cloth 72 and in the inner space of the awning 70 through an atmospheric window in a form of infrared radiation, so as to achieve cooling without energy consumption and improve user comfort. Moreover, the awning cloth 72 has excellent wrinkle resistance performance. The awning cloth 72 is not easy to wrinkle even if folded repeatedly.

It should be noted that the term "inner space of the awning 70" in the specification and claims of the present disclosure refers to a space away from the sunlight when the awning 70 is in use.

Figure 27:
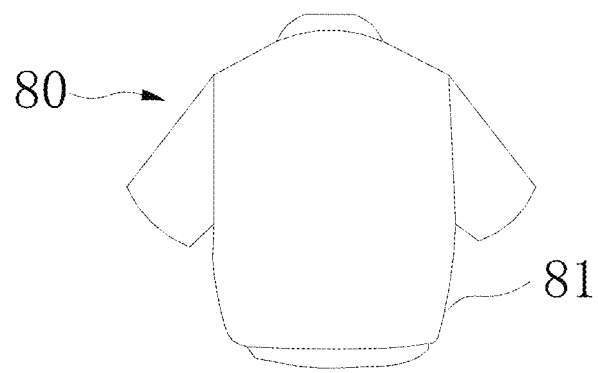
FIG. 27 is a schematic diagram of clothing made of the radiative cooling fabric of the present disclosure.

As shown in FIG. 27, one embodiment of the present disclosure provides a product made of the radiative cooling fabric of the present disclosure. The product is clothing 80 including cloth 81 made of the radiative cooling fabric. Specifically, the cloth 81 can be chest cloth, back cloth, shoulder cloth, etc. When sunlight irradiates the cloth 81, the functional layer 12 of the cloth 81 can reflect the sunlight to prevent the cloth 81 from accumulating excessive heat. The functional layer 12 can also emit the heat on the surface of cloth 81 and in the inner space of the clothing 80 (such as human body) through an atmospheric window in a form of infrared radiation, so as to achieve cooling without energy consumption and improve user's comfort. Moreover, the cloth 81 has excellent wrinkle resistance performance. The cloth 81 is not easy to wrinkle even if folded repeatedly.

Embodiment 1

A radiative cooling fabric is provided. The radiative cooling fabric includes a waterproof layer, a flexible substrate layer, an interfacial agent layer, a first functional layer, and a hydrophobic layer stacked in order. The waterproof layer is an acrylic resin with a thickness of 10 μm. The flexible substrate layer is a polyester fabric with a thickness of 1 mm. The interfacial agent layer is a polyurethane resin with a thickness of 10 μm. A thickness of the first functional layer is 30 μm, and the first functional layer includes 85 wt % epoxy resin and 10 wt % titanium dioxide (with a particle size of 5 μm), 3 wt % silicon nitride (with a particle size of 1 μm), and 2 wt % additive. The hydrophobic layer is a fluorine resin with a thickness of 10 μm.

Embodiment 2

A radiative cooling fabric is provided. The radiative cooling fabric includes a waterproof layer, a flexible substrate layer, a first functional layer, and a hydrophobic layer stacked in order. The waterproof layer is a polyurethane resin with a thickness of 20 μm. The flexible substrate layer is a polyester fabric with a thickness of 1 mm A thickness of the first functional layer is 60 μm, and the first functional layer includes 88 wt % polyimide, 5 wt % calcium carbonate (with a particle size of 3 μm), 3 wt % silicon dioxide (with a particle size of 5 μm), and 4 wt % additive. The hydrophobic layer is a fluorine resin with a thickness of 10 μm.

Embodiment 3

A radiative cooling fabric is provided. The radiative cooling fabric includes a flexible substrate layer, an interfacial agent layer, a first functional layer, and a hydrophobic layer stacked in order. The flexible substrate layer is a polyester fabric with a thickness of 1 mm. The interfacial agent layer is an epoxy resin with a thickness of 20 μm. A thickness of the first functional layer is 10 μm, and the first functional layer includes 80 wt % cycloolefin polymer, 9 wt % barium sulfate (with a particle size of 2 μm), 9 wt % silicon carbide (with a particle size of 7 μm), and 2 wt % additive. The hydrophobic layer is a silicone resin with a thickness of 20 μm.

Embodiment 4

A radiative cooling fabric is provided. The radiative cooling fabric includes a flexible substrate layer and a first functional layer stacked in order. The flexible substrate layer is a polyester fabric with a thickness of 1 mm A thickness of the first functional layer is 200 μm, and the first functional layer includes 76 wt % polyester resin, 10 wt % zinc aluminum oxide (with a particle size of 1 μm), 10 wt % silicon dioxide (with a particle size of 8 μm), and 4 wt % additive.

Embodiment 5

A radiative cooling fabric is provided. The radiative cooling fabric includes a flexible substrate layer and a first functional layer stacked in order. The flexible substrate layer is a cotton fabric with a thickness of 2 mm A thickness of the first functional layer is 150 μm, and the first functional layer includes 80 wt % polyurethane resin, 6 wt % indium tin oxide (with a particle size of 0.01 μm), 12 wt % titanium dioxide (with a particle size of 6 μm) and 2 wt % additive.

Embodiment 6

A radiative cooling fabric is provided. The radiative cooling fabric includes a flexible substrate layer and a first functional layer stacked in order. The flexible substrate layer is a nylon fabric with a thickness of 0.3 mm. A thickness of the first functional layer is 100 μm. The first functional layer includes 90 wt % acrylic resin, 4 wt % indium tin oxide (with a particle size of 3 μm), 4 wt % calcium carbonate (with a particle size of 15 μm) and 2 wt % additive.

Embodiment 7

A radiative cooling fabric is provided. The radiative cooling fabric includes a flexible substrate layer and a first functional layer stacked in order. The flexible substrate layer includes a polyester fabric with a thickness of 0.5 mm and a polyvinyl chloride resin coated on both sides of the polyester fabric. A thickness of a polyvinyl chloride resin layer is 20 μm. A thickness of the first functional layer is 80 μm. The first functional layer includes 88 wt % silicone resin, 8 wt % $Cs_xWO_3$ (with a particle size of 2 μm), 3 wt % silicon nitride (with a particle size of 10 μm), and 1 wt % additive.

Embodiment 8

A radiative cooling fabric is provided. The radiative cooling fabric includes a flexible substrate layer and a first functional layer stacked in order. The flexible substrate layer includes a polyester fabric with a thickness of 0.5 mm and a polyurethane resin coated on both sides of the polyester fabric. A thickness of a polyurethane resin layer is 20 μm. A thickness of the first functional layer is 120 μm, The first functional layer includes 85 wt % acrylic resin, 6 wt % barium sulfate (with a particle size of 3 μm), 6 wt % calcium carbonate (with a particle size of 15 μm) and 3 wt % additive.

Embodiment 9

A radiative cooling fabric is provided. The radiative cooling fabric includes a flexible substrate layer and a first functional layer stacked in order. The flexible substrate layer includes a polyester fabric with a thickness of 1 mm A thickness of the first functional layer is 100 μm. The first functional layer includes 90 wt % silicone resin, 5 wt % titanium dioxide (with a particle size of 2 μm), 3 wt % calcium carbonate (with a particle size of 10 μm) and 2 wt % additive.

Comparative Embodiment 1

A radiative cooling fabric is provided. The radiative cooling fabric includes a flexible substrate layer and a first functional layer stacked in order. The flexible substrate layer includes a polyester fabric with a thickness of 1 mm A thickness of the first functional layer is 250 μm. The first functional layer includes 90 wt % silicone resin, 5 wt % titanium dioxide (with a particle of 2 μm), 3 wt % calcium carbonate (with a particle of 10 μm), and 2 wt % additive.

Comparative Embodiment 2

A radiative cooling fabric is provided. The radiative cooling fabric includes a flexible substrate layer and a functional layer stacked in order. The flexible substrate layer includes a polyester fabric with a thickness of 1 mm A thickness of the functional layer is 5 μm. The functional layer includes 70 wt % silicone resin, 14 wt % titanium dioxide (with a particle of 2 μm), 14 wt % calcium carbonate (with a particle of 10 μm), and 2 wt % additive.

Comparative Embodiment 3

A radiative cooling fabric is provided. The radiative cooling fabric includes a waterproof layer, a flexible substrate layer, an interfacial agent layer, a functional layer, and a hydrophobic layer stacked in order. The waterproof layer is an acrylic resin with a thickness of 25 μm. The flexible substrate layer is a polyester fabric with a thickness of 1 mm. The interfacial agent layer is a polyurethane resin with a thickness of 25 μm. A thickness of the functional layer is 200 μm, and the functional layer includes 85 wt % epoxy resin, 10 wt % titanium dioxide (with a particle size of 5 μm), 3 wt % silicon nitride (with a particle size of 1 μm) and 2 wt % other additive. The hydrophobic layer is a fluorine resin with a thickness of 25 μm.

A reflectivity of the radiative cooling fabric in the above embodiments and comparative embodiments in the wavelength of 300 nm to 2500 nm and an emissivity of the radiative cooling fabric in the above embodiments and comparative embodiments in the wavelength of 7 μm to 14 μm are tested. The test results are shown in Table 1.

The wrinkle resistance of the radiative cooling fabric of the above embodiments and comparative embodiments are tested. The wrinkle recovery performance of the fabric is tested according to GB/T3819-1997 standard. Before cutting the sample, locating the sample in a standard condition (with a temperature of 20±3 degrees centigrade and a relative humidity of 65±5%) for 24 hours; marking the warp and weft in the fabric by a fabric wrinkle elasticity tester (model YG(B)541D, made in China); cutting a piece of 40 mm×15 mm sample with a shape of "convex" along the width direction of the sample and 5 cm away from the edge of the fabric; folding the sample in half according to the standard and standing for 1 minute under a pressure of 10 N; measuring the elastic angle of the sample (5 minutes after the force is released) by the fabric wrinkle elasticity tester; and obtaining an average value by measuring 5 times in warp direction and weft direction respectively. The larger the wrinkle recovery angle, the better the wrinkle resistance of the fabric. The test results are shown in Table 1.

TABLE 1

| Embodiment | Reflectivity in the avelength of 300 nm to 2500 nm | Emissivity in the wavelength of 7 μm to 14 μm | Average value of warp recovery angle | Average value of weft recovery angle |
|---|---|---|---|---|
| Embodiment 1 | 86% | 87% | 104.4° | 100.4° |
| Embodiment 2 | 88% | 89% | 103.9° | 100.2° |
| Embodiment 3 | 82% | 83% | 104.7° | 101.2° |
| Embodiment 4 | 93% | 94% | 98.4° | 93.7° |
| Embodiment 5 | 92% | 94% | 100.7° | 98.0° |
| Embodiment 6 | 92% | 93% | 102.8° | 99.3° |
| Embodiment 7 | 90% | 91% | 103.2° | 99.8° |
| Embodiment 8 | 92% | 93% | 101.5° | 98.5° |
| Embodiment 9 | 92% | 93% | 102.6° | 99.2° |
| Comparative embodiment 1 | 92% | 93% | 89.2° | 84.3° |
| Comparative embodiment 2 | 69% | 72% | 93.5° | 90.4° |
| Comparative embodiment 3 | 93% | 93% | 90.7° | 84.8° |

It can be seen from the recovery angle of the embodiment 9 and the comparative embodiment 1, when the thickness of the functional layer exceeds 200 μm, the wrinkle resistance of the fabric is significantly reduced, while the reflectivity and emissivity of the functional layer tend to be stable with the increase of the thickness. That is, when the thickness of the functional layer reaches about 200 μm, increasing the thickness of the functional layer will not improve the reflection and radiative cooling performance of the functional layer, but will make the wrinkle resistance of the fabric worse.

It can be seen from the recovery angle of the embodiment 9 and the comparative embodiment 2, when the filler in the functional layer exceeds 20%, even if the thickness of the functional layer is thin, the wrinkle resistance of the fabric will get worse.

It can be seen from the recovery angle of the embodiment 1 and the comparative embodiment 3, when the thickness of each layer in the radiative cooling fabric exceeds a certain value, the wrinkle resistance of the fabric will get worse.

The present disclosure further provides an application case of the radiative cooling fabric.

Figure 28:
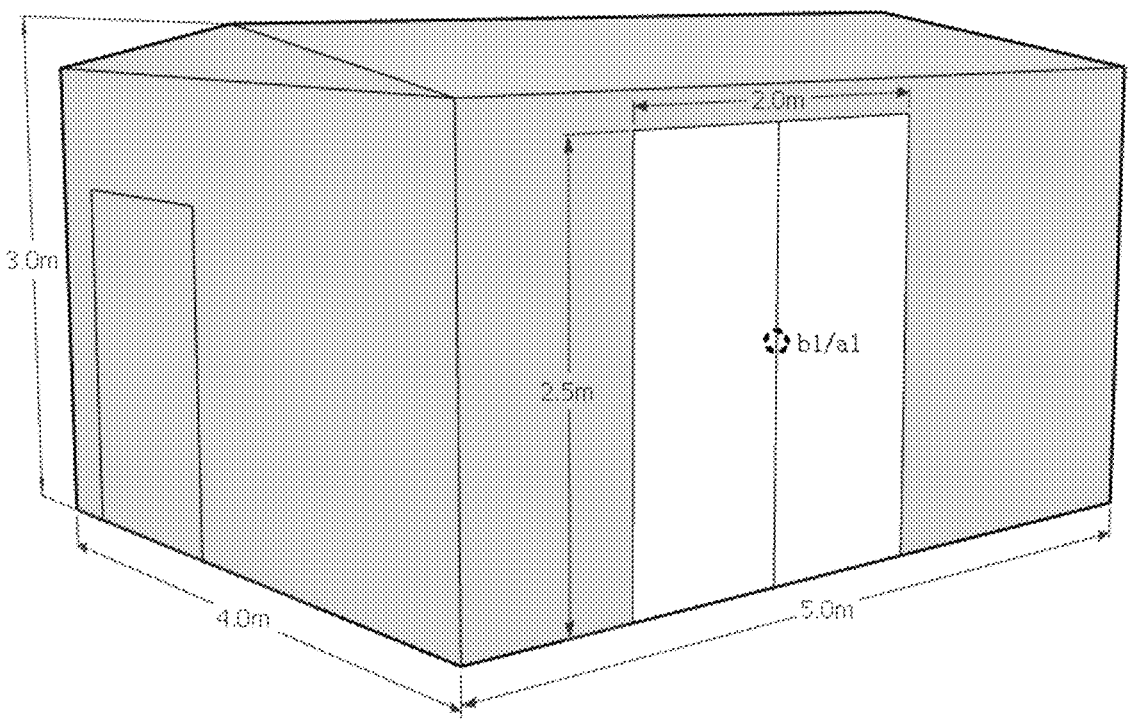
FIG. 28 is a schematic diagram of temperature measurement positions of a stainless-steel display rooms.
Figure 29:
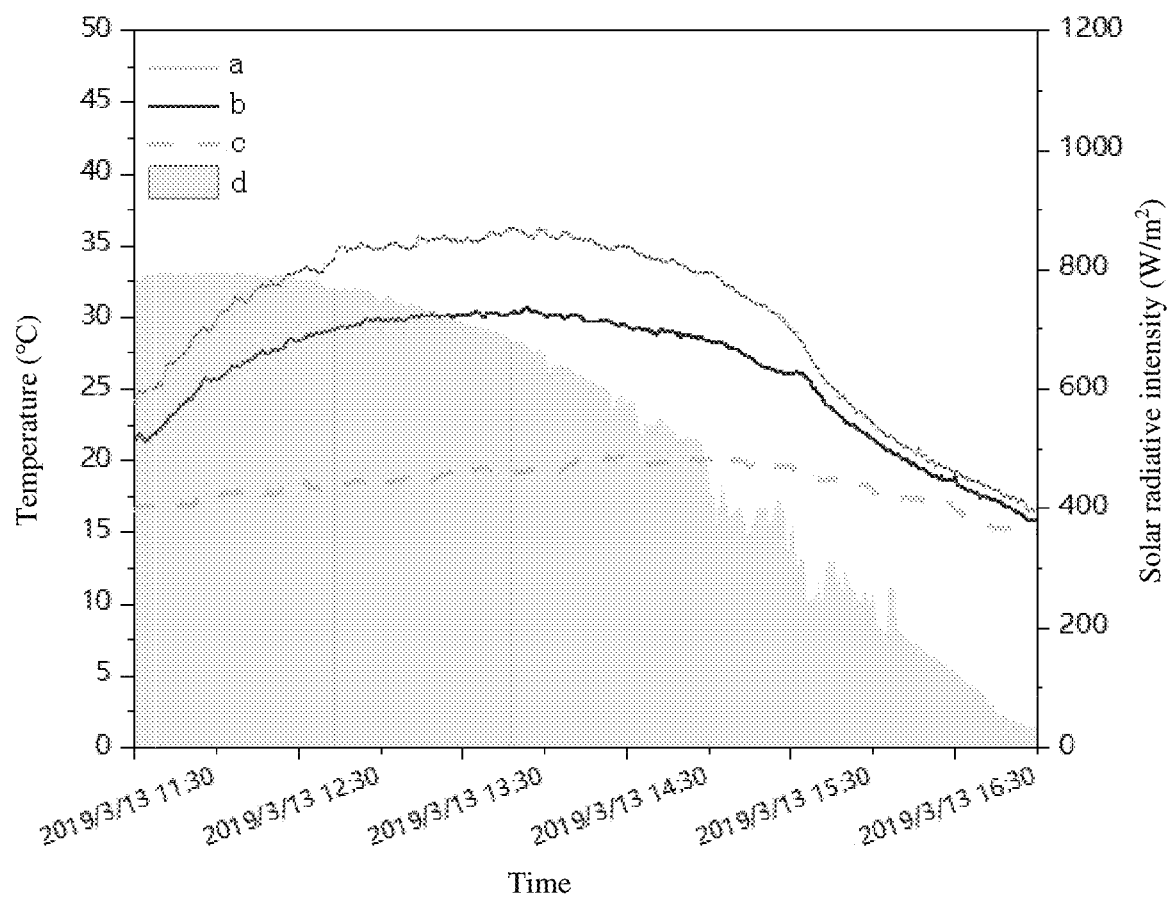
FIG. 29 is a graph showing the temperature difference of the stainless-steel display rooms shown in FIG. 28 with a curtain made of the radiative cooling fabric of the present disclosure and with a curtain made of an ordinary sunshade fabric, respectively.

As shown in FIG. 28, a stainless-steel display room A is provided with a length of 5 meters, a width of 4 meters, and a height of 3 meters. One wall of the display room has a glass window with a size of 2.5 m×2 m. A radiative cooling fabric of the embodiment of FIG. 6 is located on the inside of the glass windows of the display room A. An area of the radiative cooling fabric is 5 m². The display room A is placed in an open outdoor place, and a thermocouple with a data logger is used to measure and record the temperature change at a temperature measurement position bl in the middle of the display room A, The temperature change is shown in curve b of FIG. 29.

A stainless steel display room B is provided. The material, size, structure and shape of the display room B and the display room A are the same. The difference is that the glass window of the display room B is equipped with an ordinary shading curtain (polyester fabric with a thickness of 1 mm). An area of the shading curtain is 5 m². Place the display room B in a place same as the environment of the display room A, and a thermocouple with a data logger is used to measure and record the temperature change at a temperature measurement position al in the middle of the display room B. The temperature change is shown in curve a of FIG. 29.

While measuring the temperature change of display room A and display room B, an outdoor ambient temperature and solar radiative intensity are also measured at the same time. The ambient temperature is shown in curve c of FIG. 29, and the solar radiative intensity is shown in curve d of FIG. 29. It can be seen from the curves in FIG. 29, in the same period of time, the temperature in display room B can be up to 20 degrees centigrade higher than that of the outdoor, while the temperature in display room A can be up to 6 degrees centigrade lower than the that in display room B, which shows that the radiative cooling fabric has a good automatic cooling effect. The radiative cooling fabric can reduce the indoor temperature and improve indoor comfort. Additionally, the radiative cooling fabric is energy-saving and environmentally friendly.

Another application case of the radiative cooling fabric is provided.

Figure 30:
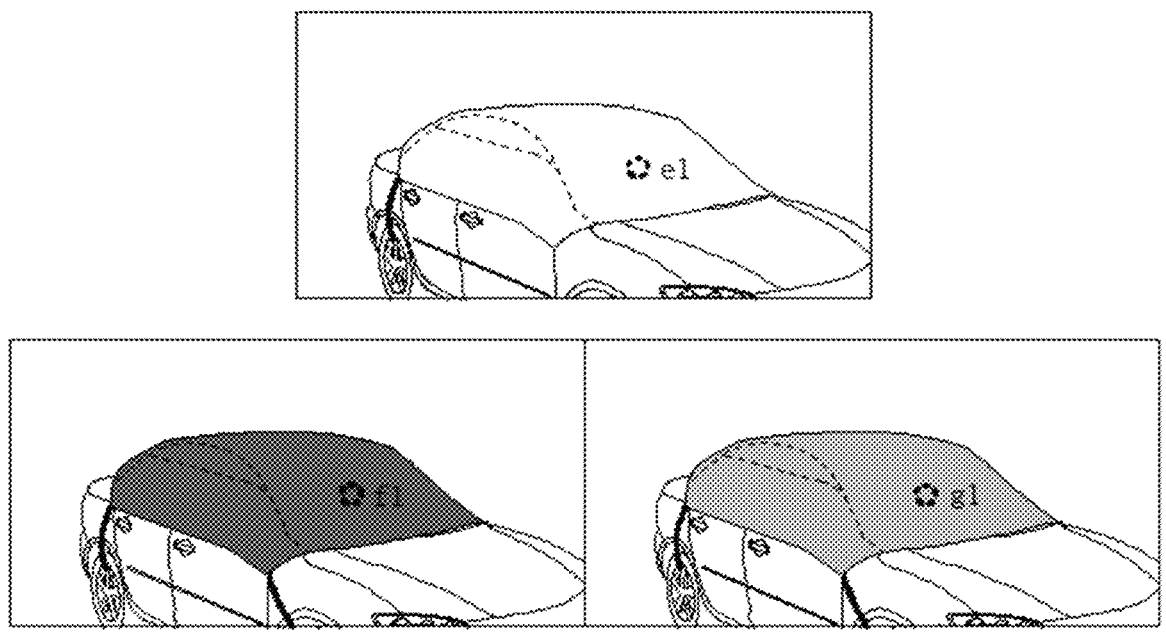
FIG. 30 is a schematic diagram of temperature measurement positions of cars.
Figure 31:
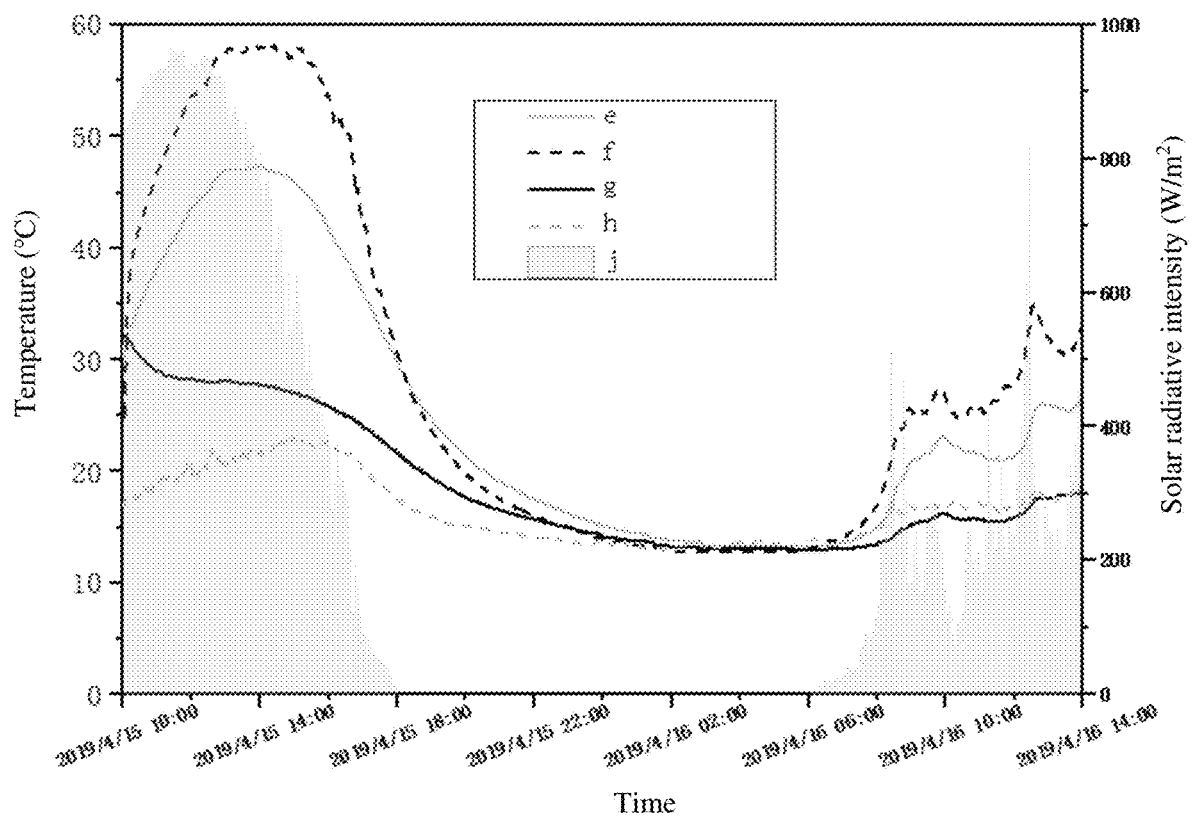
FIG. 31 is a graph showing the temperature difference of the cars shown in FIG. 30 with a car cover made of the radiative cooling fabric of the present disclosure, with a car cover made of an ordinary fabric, and without a car cover, respectively.

As shown in FIG. 30, three cars C, D, and E of the same brand and model are provided. The three cars are parked in the same environment. Car C is covered with a car cover which is made of an ordinary fabric (polyester fabric with a thickness of 1 mm). Car D is covered with a car cover made of the radiative cooling fabric of the embodiment of FIG. 8. And car E does not have any car cover. Temperature measurement positions e1, g1, and f1 are set in the middle of the cabs of the cars C, D, and E respectively. A thermocouple with a data logger is used to measure and record the temperature changes of each temperature measurement position. The measurement results are shown in curves e.g., and f of FIG. 31. While measuring the temperature changes inside the cars, an outdoor ambient temperature and solar radiative intensity are also measured at the same time. The ambient temperature is shown in curve h of FIG. 31, and the solar radiative intensity is shown in curve j of FIG. 31. It can be seen from the curves in FIG. 31, the temperature of the car with a car cover made of radiative cooling fabric is the lowest. In the same period of time, the maximum temperature difference between D and C can reach 20 degrees centigrade, and the maximum temperature difference between D and E can reach 30 degrees centigrade, which shows that the car cover made of a radiative cooling fabric can greatly reduce the temperature of the car and solve the problem of high temperature inside the car under sunlight, so as to extend the life of the car, improve the safety, and increase the comfort.

Another application case of the radiative cooling fabric is provided.

Figure 32:
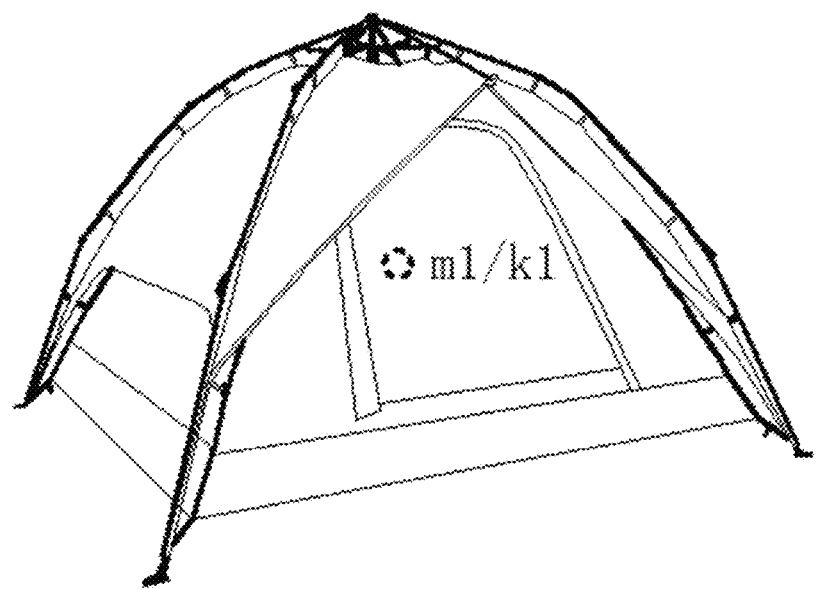
FIG. 32 is a schematic diagram of temperature measurement positions of a tent.
Figure 33:
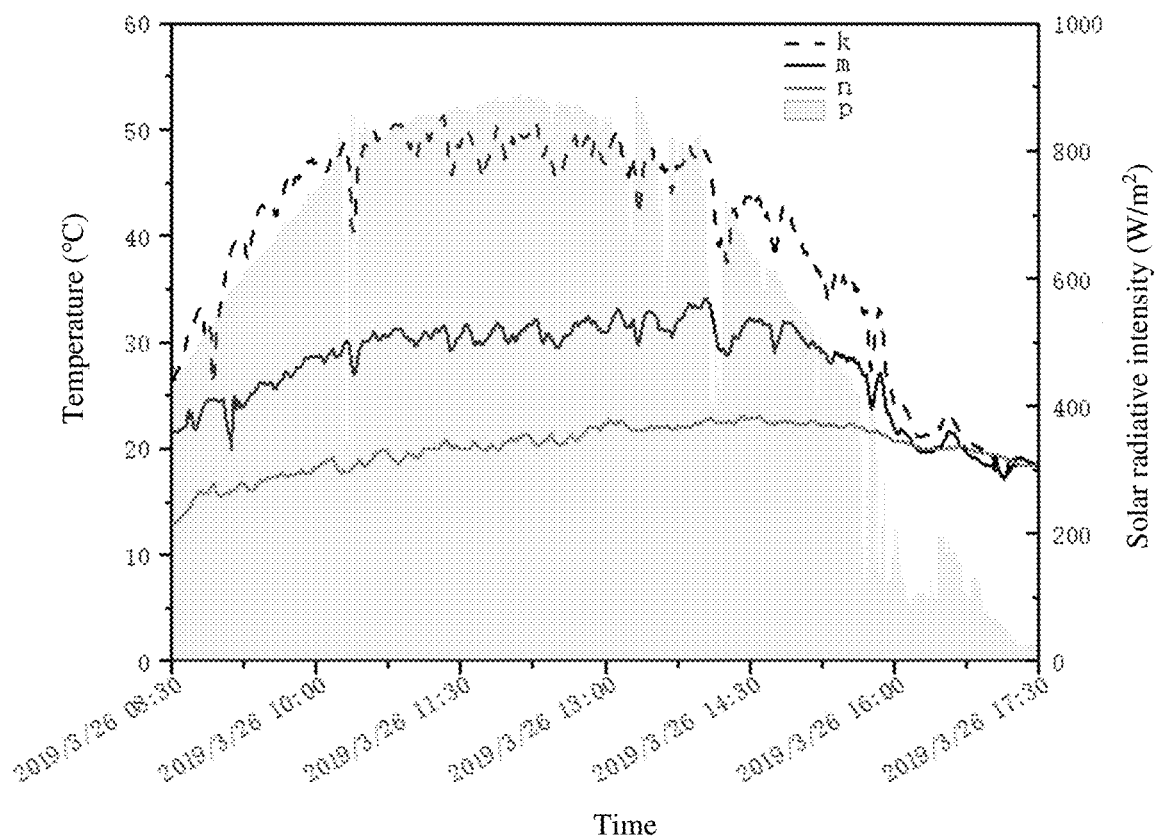
FIG. 33 is a graph showing the temperature difference of the tents shown in FIG. 32 with the radiative cooling fabric of the present disclosure and with an ordinary fabric, respectively.

As shown in FIG. 32, tent H and tent J of the same size, shape and style are provided. A flysheet of the tent H is made of a radiative cooling fabric of the embodiment of FIG. 9, and a flysheet of the tent J is made of ordinary fabric (polyester fabric with a thickness of 1 mm). The tent H and tent J are located in the same environment. Temperature measurement positions m1 and k1 are set in the middle of the tent H and tent J, respectively. The temperature changes at the positions m1 and k1 are measured and the results are shown in curves m and k of FIG. 33. While measuring the temperature changes inside the tents, an outdoor ambient temperature and solar radiative intensity are also measured at the same time. The ambient temperature is shown in curve n of FIG. 33, and the solar radiative intensity is shown in curve p of FIG. 33. It can be seen from the curves in FIG. 33, in the same period of time, the maximum temperature difference between H and J can reach 20 degrees centigrade, which shows that the tent made of a radiative cooling fabric has a good automatic cooling effect. The radiative cooling fabric can reduce the internal temperature of the tent and improve comfort.

Embodiment 10

A method for preparing a radiative cooling fabric is provided including following steps:
  providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 µm;
  coating a PET resin with a thickness of 20 µm on the flexible substrate layer, spraying a layer of titanium white powders with an average particle size of 10 µm on a surface of the PET resin before the PET resin is dried, and drying the PET resin to obtain a first function layer and a second functional layer; and
  coating a PET resin with a thickness of 20 µm on the titanium white powders, and drying the PET resin to obtain a third functional layer.

Embodiment 11

A method for preparing a radiative cooling fabric is provided including the following steps:
  providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 µm;
  coating a polyacrylic acid (PAA) resin with a thickness of 20 µm on the flexible substrate layer, spraying a layer of talcum powders with an average particle size of 20 µm on a surface of the polyacrylic acid (PAA) before the polyacrylic acid (PAA) resin is dried, and drying the polyacrylic acid (PAA) resin to obtain a first function layer and a second functional layer; and
  coating a polyacrylic acid (PAA) resin with a thickness of 10 µm on the talcum powders, and drying the polyacrylic acid (PAA) resin to obtain a third functional layer.

Embodiment 12

A method for preparing a radiative cooling fabric is provided including the following steps:
  providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 µm;
  coating a polyurethane resin with a thickness of 20 µm on the flexible substrate layer, spraying a layer of silicon dioxide powders with an average particle size of 30 µm on a surface of the polyurethane resin before the polyurethane resin is dried, and drying the polyurethane resin to obtain a first function layer and a second functional layer; and
  coating a polyurethane resin with a thickness of 10 µm on the silicon dioxide powders, and drying the polyurethane resin to obtain a third functional layer.

Embodiment 13

Providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 μm;

coating a PET resin with a thickness of 20 μm on the flexible substrate layer, wherein the PET resin layer is mixed with 10% by volume of silicon dioxide with an average particle size of 10 μm, spraying a layer of titanium white powders with an average particle size of 30 μm on a surface of the PET resin before the PET resin is dried, and drying the PET resin to obtain a first function layer and a second functional layer; and coating a PET resin with a thickness of 10 μm on the titanium white powders, wherein the PET resin layer is mixed with 5% by volume of silicon dioxide with an average particle size of 6 μm, drying the PET resin to obtain a third functional layer.

Embodiment 14

Providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 μm;

coating a PET resin with a thickness of 20 μm on the flexible substrate layer, wherein the PET resin layer is mixed with 15% by volume of titanium white powders with an average particle size of 10 μm, spraying a layer of silicon dioxide powders with an average particle size of 30 μm on a surface of the PET resin before the PET resin is dried, and drying the PET resin to obtain a first function layer and a second functional layer; and coating a PET resin with a thickness of 10 μm on the silicon dioxide powders, wherein the PET resin layer is mixed with 12% by volume of pearl powders, drying the PET resin to obtain a third functional layer.

Comparative Embodiment 4

A method for preparing a radiative cooling fabric is provided including the following steps:

providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 μm;

coating a PET resin with a thickness of 50 μm on the flexible substrate layer, wherein the PET resin is mixed with 30% by mass of silicon dioxide with an average particle size of 10 μm; and drying the PET resin.

Comparative Embodiment 5

A method for preparing a radiative cooling fabric is provided including the following steps:

providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 μm;

coating a polyurethane resin with a thickness of 100 μm on the flexible substrate layer, wherein the polyurethane resin is mixed with 25% by mass of titanium white powders with an average particle size of 10 μm; and drying the polyurethane resin.

Comparative Embodiment 6

A method for preparing a radiative cooling fabric is provided including the following steps:

providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 μm;

coating a polyurethane resin with a thickness of 20 μm on the flexible substrate layer and drying, and coating an aluminum oxide layer with a thickness of 20 nm on a surface of the polyurethane resin layer by a magnetron sputtering method; and coating a polyurethane resin with a thickness of 10 μm on the aluminum oxide layer, wherein the polyurethane resin layer is mixed with 5% by volume of silicon dioxide with an average particle size of 6 μm, and then drying the polyurethane resin.

Comparative Embodiment 7

A method for preparing a radiative cooling fabric is provided including the following steps:

providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 μm;

coating a polyurethane resin with a thickness of 20 μm on the flexible substrate layer and drying, and coating aluminum oxide layers on a surface of the polyurethane resin layer by a magnetron sputtering method, wherein a thickness of each aluminum oxide layer is 20 nm, and a number of the aluminum oxide layers is 10; and coating a polyurethane resin with a thickness of 10 μm on the aluminum oxide layers, wherein the polyurethane resin layer is mixed with 5% by volume of silicon dioxide with an average particle size of 6 μm, and then drying the polyurethane resin.

Comparative Embodiment 8

A method for preparing a radiative cooling fabric is provided including the following steps:

providing a flexible substrate layer, which includes a polyester fabric and polyvinyl chloride resin layers coated on both sides of the polyester fabric, a thickness of the polyester fabric is 1 mm, and a thickness of each polyvinyl chloride resin layer is 10 μm;

coating a polyurethane resin with a thickness of 20 μm on the flexible substrate layer and drying, wherein the polyurethane resin layer is mixed with 15% by volume of titanium white powder with an average particle size of 10 μm, and coating aluminum oxide layers on a surface of the polyurethane resin layer by a magnetron sputtering method, wherein a thickness of each aluminum oxide layer is 20 nm, and a number of the aluminum oxide layers is 10; and coating a polyurethane resin with a thickness of 10 μm on the aluminum oxide layers, wherein the polyurethane resin layer is mixed with 5% by volume of silicon dioxide with an average particle size of 6 μm, and then drying the polyurethane resin.

An emissivity of the radiative cooling fabric in the above embodiments and comparative embodiments in the wavelength of 7 μm to 14 μm and a reflectivity of the radiative cooling fabric in the above embodiments and comparative embodiments in the wavelength of 300 nm to 2500 nm are tested. The test results are shown in Table 2.

TABLE 2

| Embodiment | Emissivity in the wavelength of 7 μm to 14 μm | Reflectivity in the wavelength of 300 nm to 2500 nm | Average value of warp recovery angle | Average value of weft recovery angle |
|---|---|---|---|---|
| Embodiment 10 | 91.1% | 89.2% | 125.1° | 124.2° |
| Embodiment 11 | 92.4% | 90.2% | 127.5° | 125.2° |
| Embodiment 12 | 92.7% | 93.5% | 123.2° | 121.5° |
| Embodiment 13 | 93.6% | 93.8% | 122.° | 120.8° |
| Embodiment 14 | 93.9% | 93.4% | 119.9° | 117.7° |
| Comparative embodiment 4 | 78.2% | 75.1% | 91.4° | 91.0° |
| Comparative embodiment 5 | 79.5% | 76.6% | 92.8° | 92.5° |
| Comparative embodiment 6 | 85.1% | 78.9% | 93.5° | 92.1° |
| Comparative embodiment 7 | 85.6% | 87.0% | 92.6° | 91.7° |
| Comparative embodiment 8 | 89.7% | 88.5% | 92.0° | 90.7° |

In the foregoing embodiments, the descriptions of the various embodiments are different, and the parts that are not described in detail in a certain embodiment may be referred to the related descriptions of other embodiments.

The above embodiments are only used to explain the technical solutions of the present disclosure and are not limited thereto. Those skilled in the art should understand that they can still modify the technical solutions described in the above embodiments, or some technical features are equivalently substituted; and these modifications or substitutions do not detract from the essence of the corresponding technical solutions from the spirit and scope of the technical solutions of the embodiments of the present disclosure.

We claim:

1. A radiative cooling fabric, comprising a flexible substrate layer and a functional layer stacked in order;
wherein the functional layer comprises a first functional layer, a thickness of the first functional layer is in a range of 10 μm to 200 μm, the first functional layer comprises a first functional resin and a first functional filler dispersed in the first functional resin, and the first functional filler comprises a first filler and a second filler;
wherein a mass fraction of the first functional filler in the first functional layer is in a range of 1% to 20%, an emissivity of the radiative cooling fabric in a wavelength of 7 μm to 14 μm is not less than 80%, a reflectivity of the radiative cooling fabric in a wavelength of 300 nm to 2500 nm is not less than 80%, an average value of warp recovery angles of the radiative cooling fabric is greater than or equal to 95°, and an average value of the weft recovery angles of the radiative cooling fabric is greater than or equal to 91°;
the radiative cooling fabric further comprises a waterproof layer located on a side of the flexible substrate layer away from the functional layer, a thickness of the waterproof layer is in a range of 1 μm to 20 μm, a material of the waterproof layer is selected from acrylic resin, polyurethane resin, epoxy resin, or a combination thereof, and a transmittance of the waterproof layer is greater than or equal to 80% in a wavelength of 400 nm to 700 nm.

2. The radiative cooling fabric of claim 1, wherein a particle size of the first filler is greater than or equal to 0.01 μm and less than 5 μm, a particle size of the second filler is greater than or equal to 5 μm and less than or equal to 15 μm, a ratio of a mass of the first filler to a mass of the second filler is in a range of 1:4 to 4:1;
or
the first filler and the second filler are independently selected from $Cs_xWO_3$, tin antimony oxide, indium tin oxide, zinc aluminum oxide, silicon dioxide, silicon carbide, titanium dioxide, calcium carbonate, barium sulfate, silicon nitride, or a combination thereof.

3. The radiative cooling fabric of claim 1, wherein the functional layer further comprises a second functional layer, the first functional layer is located on the flexible substrate layer, and the second functional layer is located on a surface of the first functional layer away from the flexible substrate layer;
wherein the second functional layer is formed by disposing a second functional filler on the surface of the first functional layer; a thickness of the first functional layer is in a range of 10 μm to 30 μm, and a particle size of the second functional filler is in a range of 1 μm to 40 μm.

4. The radiative cooling fabric of claim 3, wherein a particle size of the second functional filler is 0.5 times to 1.5 times of the thickness of the first functional layer;
or
an amount of the second functional filler is in a range of 10 $g/m^2$ to 200 $g/m^2$, with respect to an area of a surface of the radiative cooling fabric;
or
the second functional filler is ceramic powder, titanium white powder, glass microbeads, silicon dioxide, calcium carbonate powder, barium sulfate, talcum powder, zinc sulfate, aluminum silicate, calcium carbonate powder, pearl powder, alumina, zinc oxide, zirconia, cerium oxide, lanthanum oxide, rhodium oxide, magnesium oxide, or a combination thereof.

5. The radiative cooling fabric of claim 3, wherein the functional layer further comprises a third functional layer located on a surface of the second functional layer away from the first functional layer, and the third functional layer comprises a second functional resin, and a thickness of the third functional layer is in a range of 10 μm to 30 μm.

6. The radiative cooling fabric of claim 5, wherein the third functional layer further comprises a third functional filler, the third functional filler is ceramic powder, titanium white powder, glass microbeads, silicon dioxide, calcium carbonate powder, barium sulfate, talcum powder, zinc sulfate, aluminum silicate, calcium carbonate powder, pearl powder, alumina, zinc oxide, zirconia, cerium oxide, lanthanum oxide, rhodium oxide, magnesium oxide, or a combination thereof; and a particle size of the third functional filler is in a range of 4 μm to 20 μm.

7. The radiative cooling fabric of claim 5, wherein the first functional resin and the second functional resin are independently selected from polyimide, cycloolefin polymer, epoxy resin, polyester resin, polyurethane resin, acrylic resin, silicone resin, fluorine resin, or a combination thereof.

8. The radiative cooling fabric of claim 1, wherein a thickness of the flexible substrate layer is in a range of 300 μm to 2 mm; and the flexible substrate layer comprises a fabric layer and a resin coating layer coated on one side or both sides of the fabric layer, wherein a thickness of the resin coating layer is in a range of 1 μm to 20 μm, a material of the fabric layer is selected from polyester, nylon, acrylic, silk, cotton, hemp, or a combination thereof, and a material of the resin coating layer is selected from polyvinyl chloride resin, acrylic resin, epoxy resin, phenol resin, polyurethane resin, or a combination thereof.

9. The radiative cooling fabric of claim 1, further comprising an interfacial agent layer located between the flexible substrate layer and the functional layer, a thickness of the interfacial agent layer is in a range of 1 μm to 20 μm, and a material of the interfacial agent layer is selected from acrylic resin, polyurethane resin, epoxy resin, or a combination thereof.

10. The radiative cooling fabric of claim 1, further comprising a hydrophobic layer located on a side of the functional layer away from the flexible substrate layer, a thickness of the hydrophobic layer is a range of 1 μm to 20 μm, a material of the hydrophobic layer is selected from fluorine resin, silicone resin, or a combination thereof, nano-scaled silicon dioxide particles are dispersed in the hydrophobic layer, a mass fraction of the silicon dioxide particles in the hydrophobic layer is in a range of 0.5% to 5%, and a transmittance of the hydrophobic layer is greater than or equal to 80% in a wavelength of 7 μm to 14 μm.

11. The radiative cooling fabric of claim 1, further comprising a weather resistant layer located on a side of the functional layer away from the flexible substrate layer, a material of the weather resistant layer is selected from fluorine resin, epoxy resin, polyester resin, polyurethane resin, acrylic resin, silicone resin, or a combination thereof, and a thickness of the weather resistant layer is in a range of 10 μm to 50 μm.

12. A product, wherein the product comprising a part which is made of the radiative cooling fabric of claim 1.

13. The product of claim 12, wherein the product is an umbrella comprising a rod, an umbrella rib and an umbrella cloth which is the part made of the radiative cooling fabric of claim 1, wherein the umbrella rib is connected to the rod, and the umbrella cloth is supported by the umbrella rib.

14. The product of claim 12, wherein the product is a car cover comprising a fixing member and a cover body which is the part made of the radiative cooling fabric of claim 1, wherein the fixing member is located on the cover body, and the fixing member is configured for fixing the cover body on a car.

15. The product of claim 12, wherein the product is a tent comprising a tent frame and a flysheet made of the radiative cooling fabric of claim 1, and the tent frame is covered by the flysheet.

16. The product of claim 12, wherein the product is a hat comprising a hat body made of the radiative cooling fabric of claim 1, and the hat body has a cavity configured for accommodating a head.

17. The product of claim 12, wherein the product is a curtain comprising a curtain body made of the radiative cooling fabric of claim 1, and the curtain body is a part of the curtain.

18. The product of claim 12, wherein the product is an awning comprising an awning frame and an awning cloth made of the radiative cooling fabric of claim 1, and the awning frame is covered by the awning cloth.

19. The product of claim 12, the product is clothing comprising cloth made of the radiative cooling fabric of claim 1.

* * * * *